United States Patent [19]

Powell et al.

[11] Patent Number: 5,402,452
[45] Date of Patent: Mar. 28, 1995

[54] INCREMENTAL PHASE SMOOTHING DESYNCHRONIZER AND CALCULATION APPARATUS

[75] Inventors: William E. Powell, Raleigh; William B. Weeber, Apex; Manal E. Afify, Raleigh, all of N.C.

[73] Assignee: Alcatel Network Systems, Inc., Richardson, Tex.

[21] Appl. No.: 935,008

[22] Filed: Aug. 25, 1992

[51] Int. Cl.⁶ .............................................. H04L 7/00
[52] U.S. Cl. ................................. 375/372; 370/105.3; 364/724.01
[58] Field of Search ....................... 375/118, 120, 112; 370/102, 105.3; 364/724.01

[56] References Cited

U.S. PATENT DOCUMENTS

| 4,941,156 | 7/1990 | Stern et al. | 375/118 |
| 4,996,698 | 2/1991 | Nelson | 375/118 |
| 5,052,025 | 9/1991 | Duff et al. | 375/118 |

(List continued on next page.)

OTHER PUBLICATIONS

1991 "Jitter reduction in SDH networks" SAT France H. Sari and G. Karam. pp. 1413–1417.
T1.105-1991 "Digital Hierarchy-Optical Interface Rates and Formats Specification" (SONET), Section 7 Synchronization.
T1X1.6/88-028-"Analysis of Jitter & Wander Associated with Pointer Adjustments," British Telecom.
T1X1.6/88-029-"A Possible Design for a Desynchronizer Accomodating Pointer Adjustments," British Telecom.
T1X1.6/89-029-"Results of Simulations of a Possible Desynchronizer Design," British Telecom.
(List continued on next page.)

Primary Examiner—Stephen Chin
Assistant Examiner—T. Ghebretinsae
Attorney, Agent, or Firm—Ware, Fressola, Van Der Sluys & Adolphson

[57] ABSTRACT

A desynchronizer (20) for desynchronizing data stored within synchronous payload envelopes of a synchronous communication protocol such as SONET (Synchronous Optical Network), provides for smoothing the periodically discontinuous clock signal associated with that data after the synchronous communication protocol overhead has been removed. The desynchronizer accommodates for shifts in the position of the payload envelope and hence, the data within the synchronous communication frame as well as adjustments within the data itself due to asynchronous bit stuff information. The desynchronizer utilizes a leak filter (26) having a linear branch (54) and an integrator branch (56), both branches having adjustable factors (61, 63, 65, 88, 90, 91, 93, 95, 100, 102, 105) regarding their operation, wherein the adjustable factors are selected depending upon threshold values (86, 87, 89, 62) which in turn are based upon the difference between the average write address and read address for the associated elastic store (22) within which the incoming data removed from the synchronous communication system frame is temporarily stored. The leak filter (26) forms part of a phase locked loop which in turn adjusts the read clock frequency (46) in a manner which minimizes overflow or underflow of the elastic store while simultaneously minimizing the rate of change of the read clock rate so as to limit jitter. A fault recovery apparatus forms part of the desynchronizer for enabling fastlock high gain factors (67, 97, 107) to quickly adjust the read clock when elastic store overflow or underflow occurs. The gain factors associated with both the linear branch and integrator branch are provisionable (118, 120) as well as elastic store size and thresholds resulting in a desynchronizer which can be modified to meet the particular jitter requirements of a particular synchronous communication system. A calculation engine (82) performs iterative calculations to generate the leak filter output value using a reduced number of logic gates for ASIC implementation.

16 Claims, 24 Drawing Sheets

U.S. PATENT DOCUMENTS

| | | | |
|---|---|---|---|
| 5,067,126 | 11/1991 | Moore | 370/102 |
| 5,131,013 | 7/1992 | Choi | 375/118 |
| 5,200,982 | 4/1993 | Weeber | 375/118 |

OTHER PUBLICATIONS

T1X1.6/88-026–"A Synchronous Desynchronizer." Bellcore Signals:, Bellcore.

T1X1.6/88-041–"Pointer Spreading Desynchronizer," Northern Telecom.

T1X1.3/92-071–"Jitter Accumulation Results in SONET Islands for Mill-Hertz NE Clock Bandwidths," Alcatel.

T1X1.3/92-072–"DS3 Payload Output Jitter Proposal," Alcatel.

T1X1.3/92-017–"Additional SONET Islands Jitter Simulation Results," Alcatel.

T1X1.392-006–"Initial Draft of SONET Jitter Standard," Tellabs.

T1 LB280–"A Technical Report on the Effects of SONET on Payload Oytput Jitter," T1X1.3.

T1X1.6/90-005–"STS-1 and OC-N Jitter Proposal," Alcatel.

"Design and Performance Verification of a SONET-TO-DS3 Desynchronizer", Hamlin, Jr., TranSwitch Corp. Shelton, Connecticut, published before Feb. 25, 1992.

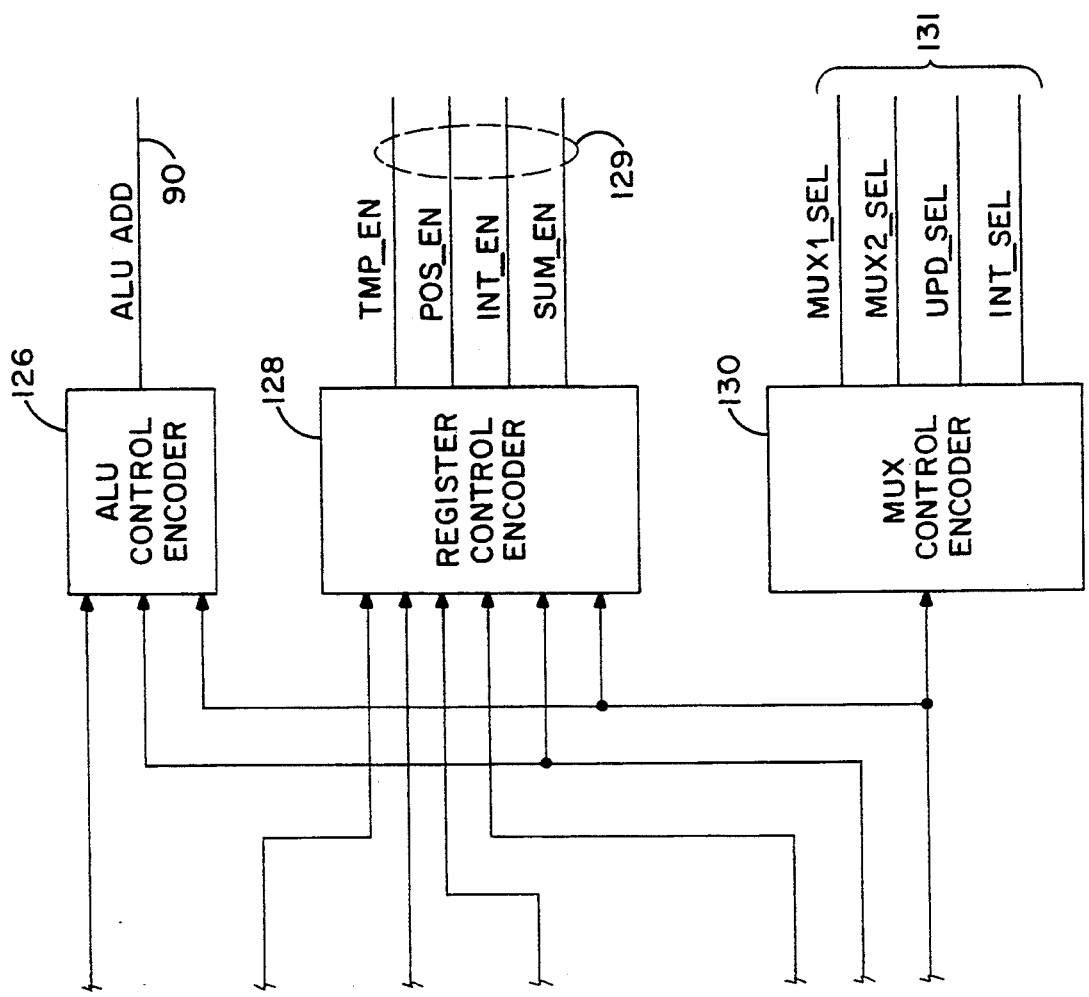

FIG. 6B

| EVENT SEQUENCE | | CONDITIONS |
|---|---|---|
| 0  9_ROW_AVG -ESS *→ | POS | ALWAYS |
| 1  (POS + O) >> LIN_O → | TMP | ALWAYS |
| 2  TMP + O → | SUM | ALWAYS |
| 3  (POS-/+ T1) >>LIN_T1→ | TMP | ALWAYS |
| 4  TMP + SUM → | SUM | IF T1 ACTIVE |
| 5  (POS-/+ T2) >>LIN_T2→ | TMP | ALWAYS |
| 6  TMP + SUM → | SUM | IF T2 ACTIVE |
| 7  (POS-/+ T2A >>LIN_T2A→ | TMP | ALWAYS |
| 8  TMP + SUM → | SUM | IF T2A ACTIVE |
| 9  (POS + O >>LIN_FL → | TMP | ALWAYS |
| 10  TMP + O → | SUM | IF FL ACTIVE |
| 11  O + O → | INT | IF FL ↑ |
| 12  (INT + O) >>FK1 → | TMP | ALWAYS |
| 13  TMP + SUM → | SUM | ALWAYS |
| 14  (POS + O) >> INT *→ | TMP | ALWAYS |
| 15  INT + TMP → | INT | NO ROLLOVER |
| 16  DITHER + SUM → | SUM | ALWAYS |
| 17  HALFDAC + SUM → | SUM | ALWAYS |

BTLK EVENT SEQUENCE $$FL = 0 : \begin{bmatrix} POS\_SIGN = + & : & SUM = DITHER + HALFDAC + [INT >> FK1] + POS/LIN\_NOM + \\ POS\_SIGN = - & : & SUM = DITHER + HALFDAC + [INT >> FK1] + POS/LIN\_NOM + \end{bmatrix}$$

$$FL = 1 : SUM = DITHER + HALFDAC + [INT >> FK1] + POS/LIN\_NOM +$$

FIG. 6C

OTHER FUNCTIONS

SET POS_SIGN = +/−

IF SIGN = POS_SIGN, SET T1 FLAG

IF SIGN = POS_SIGN, SET T2 FLAG

IF SIGN = POS_SIGN, SET T2A FLAG

SELECT PROPER INT_*

$$\left[ \begin{array}{l} [(POS - T1) >> LIN\_T1] \quad \text{IF POS} - T1 > 0 \\ [(POS + T1) >> LIN\_T1] \quad \text{IF POS} + T1 < 0 \end{array} \right] + \left[ \begin{array}{l} [(POS - T2) >> LIN\_T2] \quad \text{IF POS} - T2 > 0 \\ [(POS + T2) >> LIN\_T2] \quad \text{IF POS} + T2 < 0 \end{array} \right] + \left[ \begin{array}{l} [(POS - T2A) >> LIN\_T2A] \quad \text{IF POS} - T2A > 0 \\ [(POS + T2A) >> LIN\_T2A] \quad \text{IF POS} + T2A < 0 \end{array} \right]$$

$[(POS) >> LIN\_FL]$

PARTIAL PRODUCT TABLE

| CYCLE # | MUX1 SELECT | MUX2 SELECT | ACCUMULATOR OUTPUT | |
|---|---|---|---|---|
| 0 | ACM<17..0> | ESS* | ACM−ESS_* | |
| 1 | POS<17..0> | "O" | POS + "O" | |
| 2 | TEMP<31..0> | "O" | TEMP + "O" | |
| 3 | POS<17..0> | T1 | IF ACM=POS ACM−T1 | IF ACM=NEG ACM + T1 |
| 4 | TEMP<31..0> | SUM<31..0> | TEMP + SUM | |
| 5 | POS<17..0> | T2 | IF ACM=POS ACM−T2 | IF ACM=NEG ACM + T2 |
| 6 | TEMP<31..0> | SUM<31..0> | TEMP + SUM | |
| 7 | POS<17..0> | T2A | IF ACM=POS ACM−T2A | IF ACM=NEG ACM + T2A |
| 8 | TEMP<31..0> | SUM<31..0> | TEMP + SUM | |
| 9 | POS<17..0> | "O" | POS + "O" | |
| 10 | TEMP<31..0> | "O" | TEMP +"O" | |
| 11 | "O" | "O" | "O" + "O" | |
| 12 | IREG<31..0> | "O" | IREG + "O" | |
| 13 | TEMP<31..0> | SUM<31..0> | TEMP + SUM | |
| 14 | POS<17..0> | "O" | POS + "O" | |
| 15 | IREG<31..0> | TEMP<31..0> | IREG + TEMP | |
| 16 | DITHER | SUM<31..0> | DITHER + SUM | |
| 17 | HALFDAC | SUM<31..0> | SUM + HALFDAC | |
| 18 | | | | |

FIG. 7A

| SHIFT VARIABLE VALUE | SUM<31..0> | TEMP<31..0> | IREG<31..0> | POS<31..0> |
|---|---|---|---|---|
| | | | | |
| LIN_NO | | | | NORM_VALUE |
| | | $G_{(LIN\_NO)}$ | | |
| LIN_T1 | $G_{(LIN\_NO)}$ | | | |
| | | $G_{(LIN\_T1)}$ | | |
| LIN_T2 | (IF T1=1) SUM + G $_{(LIN\_T1)}$ | | | |
| | | $G_{(LIN\_T2)}$ | | |
| LIN_T2A | (IF T2=1) SUM + G $_{(LIN\_T2)}$ | | | |
| | | $G_{(LIN\_T2A)}$ | | |
| LIN_FL | (IF T2A=1) SUM + G $_{(LIN\_T2A)}$ | | | |
| | | $G_{(LIN\_FL)}$ | | |
| | (IF FL=1) G + "0" $_{(LIN\_FL)}$ | | | |
| FK1 | | | (IF FL↑) IREG=0 | |
| | | $G_{FK1}$ | | |
| INT_*(FK4) | SUM + G $_{FK1}$ | | | |
| | | $G_{INT\_*(FK4)}$ | | |
| | | | IREG + TEMP | |
| | DITHER + SUM | | | |
| | SUM + HALFDAC | | | |

FIG. 7B

DESYNCHRONIZER REGISTERS    TESIZE=0

| VARIABLE NAME | (CPUEQPT*=HI) ROBBED OVERHEAD MODE | | (CPUEQPT*=LO) UP MODE |
|---|---|---|---|
| | BWSEL=0 SET 1 | BWSEL=0 SET 2 | VARIABLE VALUES |
| LIN_NO | 11 | 10 | 4-BITS |
| LIN_T1 | 8 | 8 | " |
| LIN_T2 | 7 | 7 | " |
| LIN_T2A | 6 | 6 | " |
| LIN_FL | 2 | 2 | " |
| INT_NO | 14 | 12 | 4-BITS |
| INT_T1 | 14 | 13 | " |
| INT_T2 | 13 | 13 | " |
| INT_T2A | 10 | 10 | " |
| INT_FL | 0 | 0 | " |
| UDR_NO | 8 | 8 | 4-BITS |
| UDR_T1 | 2 | 2 | " |
| UDR_T2 | 0 | 0 | " |
| UDR_T2A | 0 | 0 | " |
| UDR_FL | 0 | 0 | " |
| | TESIZE=0 | TESIZE=1 | |
| THR_T1 | 12 | 5 | 8-BITS |
| THR_T2 | 18 | 7.5 | " |
| THR_T2A | 22 | 9.5 | " |
| FL_TIMER | 255MS | 255MS | 5-BITS (31MS – 1.06S) |
| | TESIZE=0 | TESIZE=1 | |
| ESS_* | 103680 | 51840 | 8-BITS |

FIG. 8A

| HALFDAC | 1619 |
|---|---|
| DITHER | 6 BIT PSEUDO RANDOM VALUE |
| FK1 | 10 |

FIG. 8B

$\Delta N_{OUTX}$ = 9 ROW AVG COUNT
$G(X)$ = GAIN FACTOR
$T_X$ = CONSTANT FOR EACH THRESHOLD LEVEL

| FIG. 10A | FIG. 10B |
|---|---|

FIG. 10

INCREMENTAL PHASE SMOOTHING DESYNCHRONIZER AND CALCULATION APPARATUS

TECHNICAL FIELD

The present invention is directed to synchronous digital communication systems and specifically, desynchronizers used in such systems. It is specifically directed toward smoothing a payload clock associated with a digital signal carried by a SONET (Synchronous Optical NETwork) protocol signal which has been pointer processed. The digital signal may also be adjusted through use of asynchronous stuff bits.

BACKGROUND OF THE INVENTION

As discussed generally in *Digital Telephony*, Second Edition (John Bellamy, John Wiley & Sons, Inc.) at Chapter 7, the problems associated with network synchronization control and management include maintaining a smooth payload clock at a network node. As noted there, a number of factors are associated with the problem of variations in the clock signal as received downstream from the original sender, including clock instability, noise and interference, effective changes in the length of the transmission medium, changes in the velocity of propagation, doppler shifts, irregular timing information, etc., all of which affect the received clock downstream from the sending source. Typically, elastic stores have been used in the recovery of clock information with using phase locked loops in association with a variable control oscillator to adjust the read signal associated with the data stored in the elastic store for transmission further downstream.

In addition, since the adoption of synchronous optical network standards, such as SONET and the CCITT counterpart known as Synchronous Digital Hierarchy (SDH), standard ways for formatting digital signals, such as DS-1, DS-1C, DS-2, DS-3 and CCITT counterparts, within a synchronous payload envelope (SPE, called a virtual container —VC— by CCITT) have existed. The SONET and the SDH standards provide for movement of the SPE within the SONET or SDH defined frame. Movement of the payload effectively means a change in the rate at which the digital signal is being written at a node of the synchronous network. Desynchronizers attempt to smooth this rate as read from the node so that the extracted digital signal has a payload clock frequency as constant as possible, thereby minimizing this rate of change, otherwise known as jitter.

As the payload is removed from the synchronous frame containing line and section overhead, the resulting periodically discontinuous payload clock signal must be smoothed to a periodically continuous clock signal associated with the resynchronized payload output data. An elastic store provides straightforward means for accomplishing this result. The payload data as removed from the synchronous frame is thus written into the elastic store at the periodically discontinuous ram. This discontinuous rate, as averaged over many synchronous frames, is then used to read data from the elastic store at the digital signal's periodically continuous rate. The pointer mechanism comprises a set (pointer word is actually in 2 bytes) of information which is used to define the start of the next SONET synchronous payload envelope (SPE) in order to allow the envelope to move within the SONET frame. When there is a pointer adjustment, the amount of data within the SPE for the current SONET frame changes by one byte. However, it is not desirable to make an instantaneous adjustment in the elastic store read clock to reflect this change. Rather, it is desirous that the read clock rate gradually increase or decrease to accommodate the pointer adjustment so as to minimize output jitter and to bring the read clock frequency back to average write clock frequency. The slower the adjustment is made to the read clock frequency, the less output jitter (rate of change of the read clock) is generated.

Ideally if the payload (digital signal) did not move within the synchronous frame and if asynchronous stuff bits were not required within the payload itself, no jitter would be seen on the elastic store read clock. However, both payload movement within the synchronous frame, known as pointer movement, and asynchronous stuff bits to accommodate data rate fluctuation within the payload itself, do occur.

A listing of prior art documents which are directed to the problems associated with desynchronizers, including SONET desynchronizers is presented in Table 1.

TABLE 1

| | REFERENCES | |
|---|---|---|
| 1. | T1.105-1991 | "Digital Hierarchy - Optical Interface Rates and Formats Specification (SONET), Section 7 Synchronization |
| 2. | T1X1.6/88-028 | "Analysis of Jitter & Wander Associated with Pointer Adjustments," British Telecom. |
| (2a) | T1X1.6/88-029 | "A Possible Design for a Desynchronizer Accommodating Pointer Adjustments," British Telecom. |
| 3. | T1X1.6/89-029 | "Results of Simulations of a Possible Desynchronizer Design," British Telecom. |
| 4. | T1X1.6/88-026 | "A Synchronous Desynchronizer." Bellcore Signals," Bellcore. |
| 5. | T1X1.6/88-041 | "Pointer Spreading Desynchronizer," Northern Telecom. |
| (5a) | T1X1.3/92-071 | "Jitter Accumulation Results in SONET Islands for Milli-Hertz NE Clock Bandwidths," Alcatel. |
| (5b) | T1X1.3/92-072 | "DS3 Payload Output Jitter Proposal," Alcatel. |
| (5c) | T1X1.3/92-017 | "Additional SONET Islands Jitter Simulation Results," Alcatel. |
| (5d) | T1X1.3/92-006 | "Initial Draft of SONET Jitter Standard," Tellabs. |
| 6. | | "Short Term Stability Specification of SONET Timing Reference Signals," Bellcore. |
| 7. | T1 LB280 | "A Technical Report on the Effects of SONET on Payload Output Jitter, T1X1.3 |
| 8. | T1X1.6/90-005 | "STS-1 and OC-N Jitter Proposal," Alcatel |
| 9 | | "Design and Performance Verification of a SONET-TO-DS3 Desynchronizer", Hamlin, Jr., TranSwitch Corp., Shelton, Connecticut, published before February 25, 1992. |
| 10. | | U.S. Pat. No. 4,996,698 - Nelson - February 26, 1991 |
| 11. | | U.S. Pat. No. 5,052,025 - Duff et al - September 24, 1991 |

The problem addressed in prior art devices is thus to smooth the receive clock of the digital signals contained within the SPE, such as a DS-3 signal or a DS-1 signal so as to minimize output jitter while simultaneously inhibiting elastic store overflow or underflow.

Prior art techniques associated with SONET to DS-3 desynchronizers typically cause output phase transitions in the one unit interval (UI) range (one bit), which at the DS-3 rate corresponds to 22 nanoseconds (ns) (1/44.736 mb/sec). Such large phase steps can cause high levels of jitter on the recovered clock since they are only filtered with relatively high bandwidth phase lock loops (PLL's). Various manufacturers have devices which cause such levels of jitter, as noted in Table 1.

In the technique disclosed in U.S. Pat. No. 4,996,698, the pointer changes are smoothed using a high-pass filter and summing the output of this filter with the periodically discontinuous payload clock and then applying this summed signal to a type 2 low-pass filter using a phase locked loop synchronizing technique.

U.S. Pat. No. 5,052,025 discloses an adaptive bit leaking arrangement in conjunction with a digital phase locked loop and synchronizing elastic store to achieve improved jitter performance. An estimate of a bit leaking interval is adaptively obtained based on the intervals between a sequence of consecutive pointer adjustments in the received signal.

Although these prior art techniques have been able to reduce output jitter associated with pointer adjustments, recent SONET/asynchronous jitter studies such as the Alcatel T1X1.3 contributions to T1X 1.3/92-017, −041 have shown that peak jitter levels of 0.2 −0.25 (UI) unit interval per pointer, or lower are required to limit pointer generated jitter to reasonable allocation levels. At the present time it has been found that the filtering algorithm used in a DS-1 rate desynchronizer as disclosed in applicant's copending application Ser. No. 771,037, is not readily adaptable to a DS-3 rate. This is due to the fact that a high frequency over sampling clock must be used which is not practicable at the present time for a DS-3 rate. The present invention overcomes such problems associated with the prior art while providing improved fault recovery and programmability of the desynchronizer parameters. It also uses an iterative calculation engine which is able to calculate the bit leaking value on a repetitive basis while dramatically reducing the number of gates necessary to implement the circuitry as an ASIC.

SUMMARY OF THE INVENTION

A desynchronizer according to the present invention uses an "in-line" filtering approach in which the (PLL) phase locked loop VCO frequency, and thus the output phase of the de, synchronizer, is determined by an offset position from elastic store center, through use of digital filtering techniques and discrete thresholds. A leak filter having a linear branch and an integrator branch is used, wherein the linear branch and integrator branch incorporate shift factors that are selectably based upon detected threshold values, wherein the threshold values represent the amount the elastic store fill position is off-center. Thus an extensive fault recovery procedure is used so as to gracefully degrade jitter performance of the desynchronizer under fault conditions. In addition, all significant parameters of the desynchronizer are externally processor programmable, including bit leaking bandwidths, elastic store thresholds, and effective elastic store size. Such programmability allows for field changes to be made in the desynchronizer characteristics, thereby yielding flexibility as standards and customer requirements evolve. A dither module is also used to effectively increase the output resolution of the D/A converter, thereby providing smooth phase transitions on the read payload clock as the elastic store nears its center position.

In the present assignee's patent application Ser. No. 771,037 filed Oct. 2, 1991, now U.S. Pat. No. 5,200,982 for In-Line Piece-Wise Linear Desynchronizer, a type of digital filtering algorithm is used which yields incrementally small phase adjustments. The technique disclosed uses a filtering algorithm that is fundamentally different from that disclosed in the present application, especially in the area of the elastic store fill detector, digital filtering algorithms, fault recovery and provisioning capability.

Other techniques are also disclosed in applicant's co-pending application filed on the same date herewith entitled "Desynchronizer for Digital Communication System", which is directed to a fractional-bit leaking desynchronizer. In such a desynchronizer, a "subtractive" filtering method is employed. That is, the pointer adjustments and changes in asynchronous stuff bit activity are hidden from a higher bandwidth analog PLL by subtracting their effects before they reach the PLL. Then the subtracted pointer is slowly and incrementally leaked from the desynchronizer with very small or fractional phase steps which are much less then one UI. Such a subtractive approach allows the selective filtering of either pointer adjustments or both pointer adjustments plus asynchronous stuff bits. However, this subtractive technique requires the use of a programmable read only memory (PROM) to store correction co-efficients which depend on where the payload pointer is located within the SONET frame.

The present desynchronizer avoids use of a "subtractive" approach by providing a desynchronizer based upon an in-line filtering approach. Thus there is no error generated due to the subtractive effect found in other architectures and no external correction coefficient information needs to be stored in memory such as a PROM. Filtering of all payload phase effects such as pointer adjustments, asynchronous stuff bit rate changes, and SONET frame changes, are performed in an imbedded digital filter typically implemented in major part as an ASIC.

The overall result is a desynchronizer which meets all known requirements for desynchronizing a DS-3 signal. Levels of jitter from 2 to 100 times lower than prior art devices are obtained, while the extensive fault recovery circuitry is able to accommodate fault conditions from 5 to 20 times worse than known existing desynchronizer designs. In addition, the desynchronizer's transfer function, although different at different thresholds, is nevertheless continuous, thereby resulting in a more stable system. Furthermore, external PROM's and D/A converters are eliminated with the present invention.

Implementation of the digital filtering and threshold detection is accomplished through use of a calculation engine which greatly simplifies such implementation and which is applicable to algorithmic calculating situations in general.

OBJECTS OF THE INVENTION

It is therefore a principal object of the present invention to provide a desynchronizer for desynchronizing an asynchronous digital signal transported in a payload envelope within a synchronous frame by use of a digital filmring techniques that adjust linear and integrator constants based upon detected thresholds and thereby be able to accommodate pointer adjustments and other variations in the received digital signal so as to minimize jitter of the payload clock reading the digital signal at the output of the desynchronizer.

Another object of the present invention is to provide a desynchronizer that includes fault recovery circuitry which incrementally increases the digital filter bandwidth as the fill position in the elastic store is moved further from the center of the elastic store such that thresholds, when exceeded, cause constants associated with the nominal filtering bandwidth and integrator constants associated with the phase locked loop to change so as to help prevent elastic store overflow or underflow at the expense of increased payload clock jitter.

Another object of the present invention is to provide a desynchronizer of the above description which includes an output dither circuit that effectively increases the output resolution of the desynchronizer and its internal D/A converter so as to allow smooth phase transitions on the desynchronizer output clock as the elastic store nears its center position.

Another object of the present invention is to provide a desynchronizer of the above description in which a calculation engine is used to perform linear branch filtering, integrator branch filtering and fault recovery through use of iterative calculation and storage of intermediate results.

A still further object of the present invention is to provide such a calculation engine for performing general arithmetic and logic operations.

Other objects of the present invention will in part be obvious and will in part appear hereinafter.

BRIEF DESCRIPTION OF THE DRAWINGS

For a fuller understanding of the nature and objects of the present invention, reference should be made to the following detailed description taken in connection with the accompanying drawings, in which:

FIGS. 5A, 5B, and 5C, is a schematic diagram of the sequencer and control circuitry of the calculation engine used to perform the linear branch filtering, integrator branch filtering and fault recovery portions of the desynchronizer.

FIGS. 6B and 6C, is a diagram of the iterative steps and overall calculations performed by the calculation engine.

FIGS. 7A and 7B illustrates the partial product results of the calculation engine.

FIG. 8A is a diagram that illustrates the values of the desynchronizer registers for two set conditions.

FIG. 8B illustrates the dither, HALFDAC, and integrator output gain values.

FIG. 10, comprising

BEST MODE FOR CARRYING OUT THE INVENTION

Figure 1:
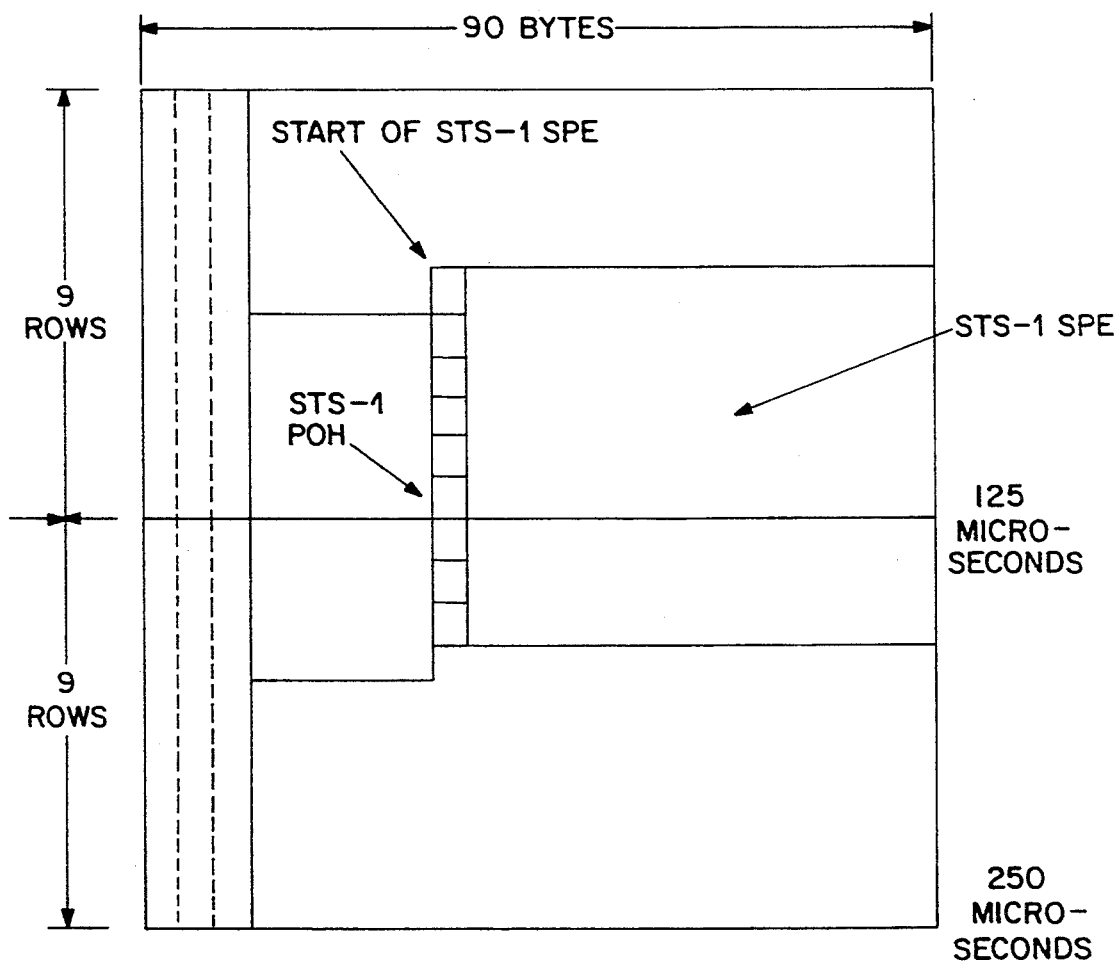
FIG. 1 is a diagram illustrating two consecutive synchronous transport signal (STS) frames associated with a SONET protocol system, showing how the synchronous payload envelope (SPE) containing the desired digital signal (such as a DS-3 digital signal) can span across such frames.
Figure 2A:
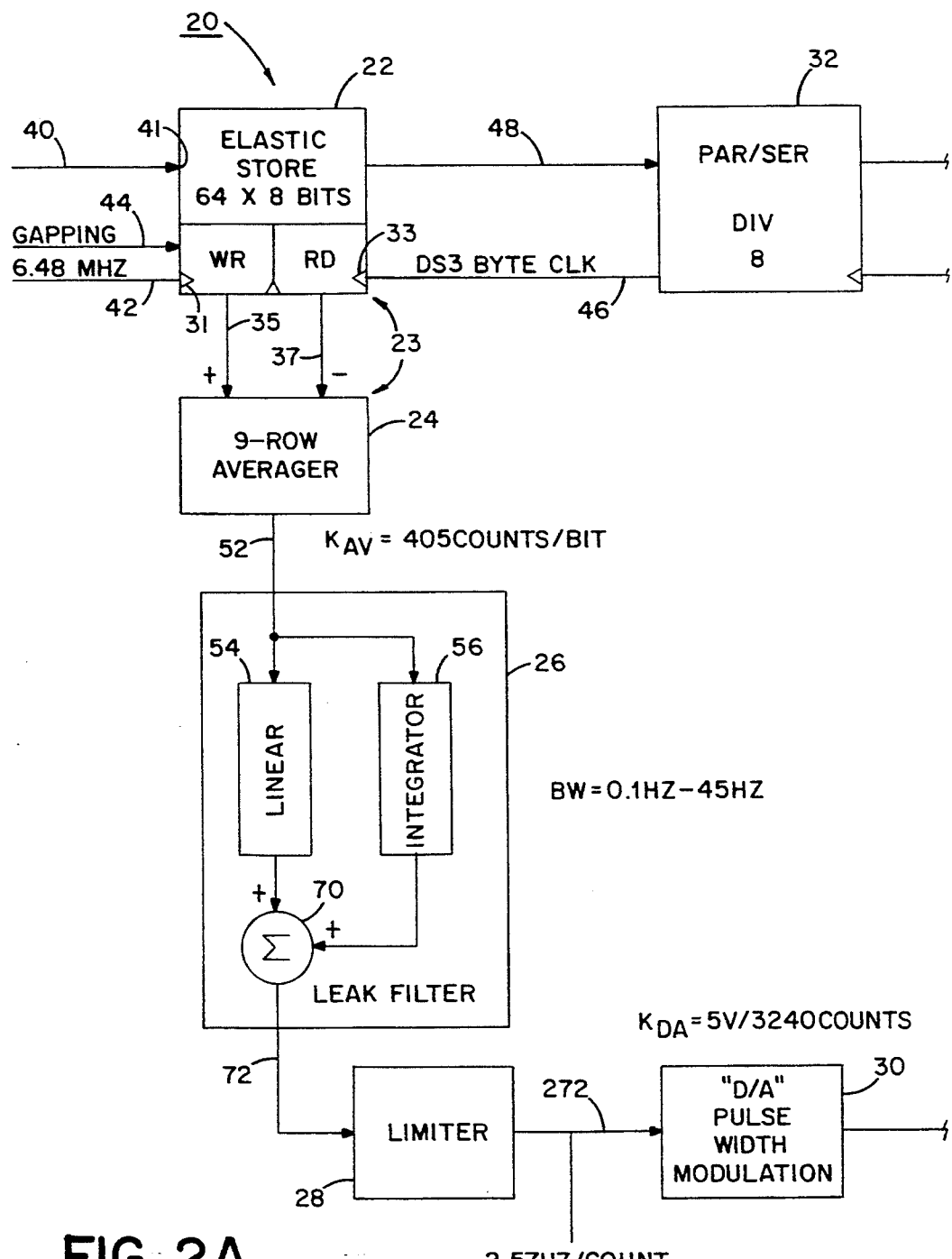
FIGS. 2A and 2B, is an overall block diagram of the desynchronizer according to the present invention, including circuitry which is fabricated within an ASIC.
Figure 2B:
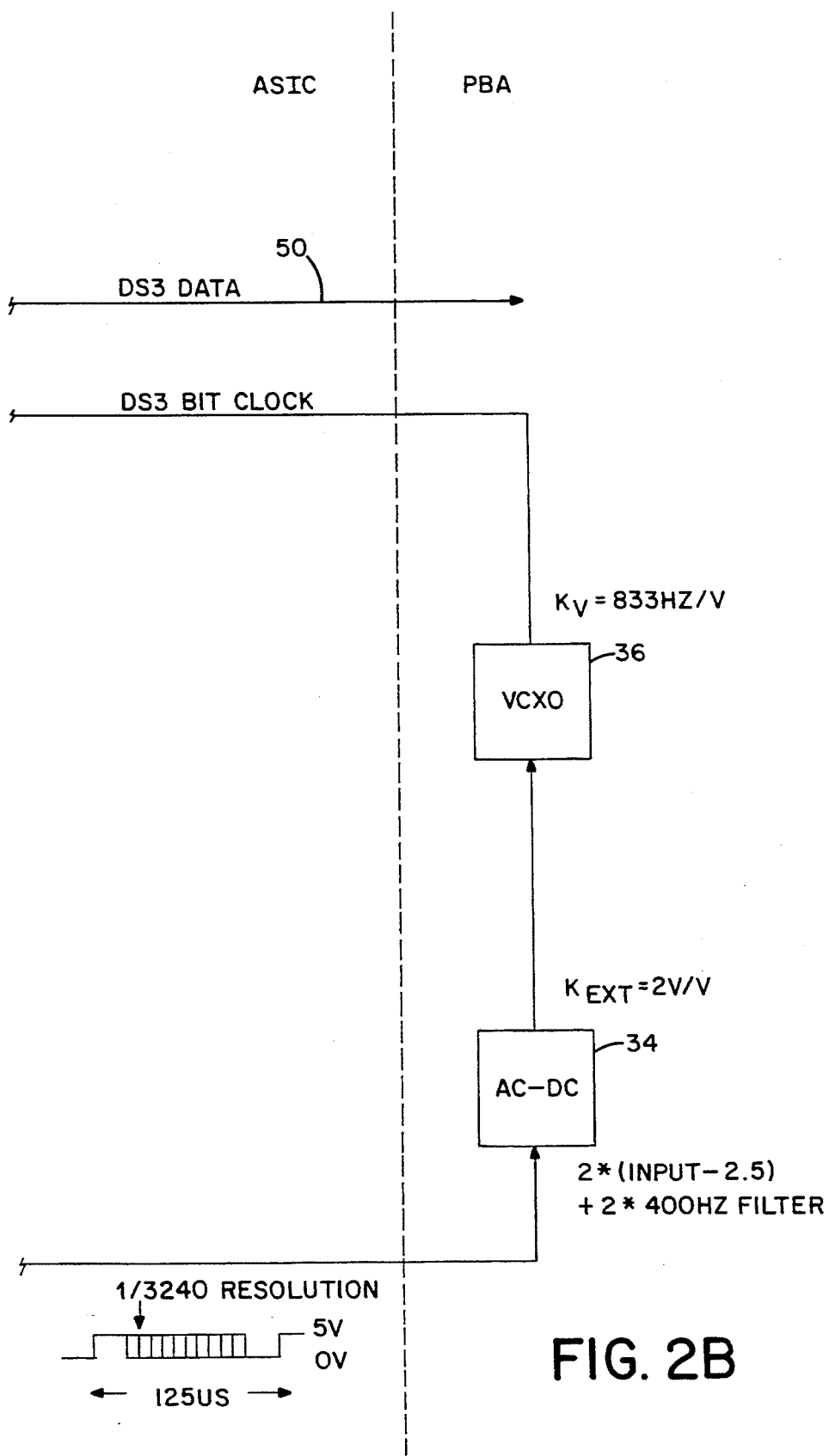
Figure 3A:
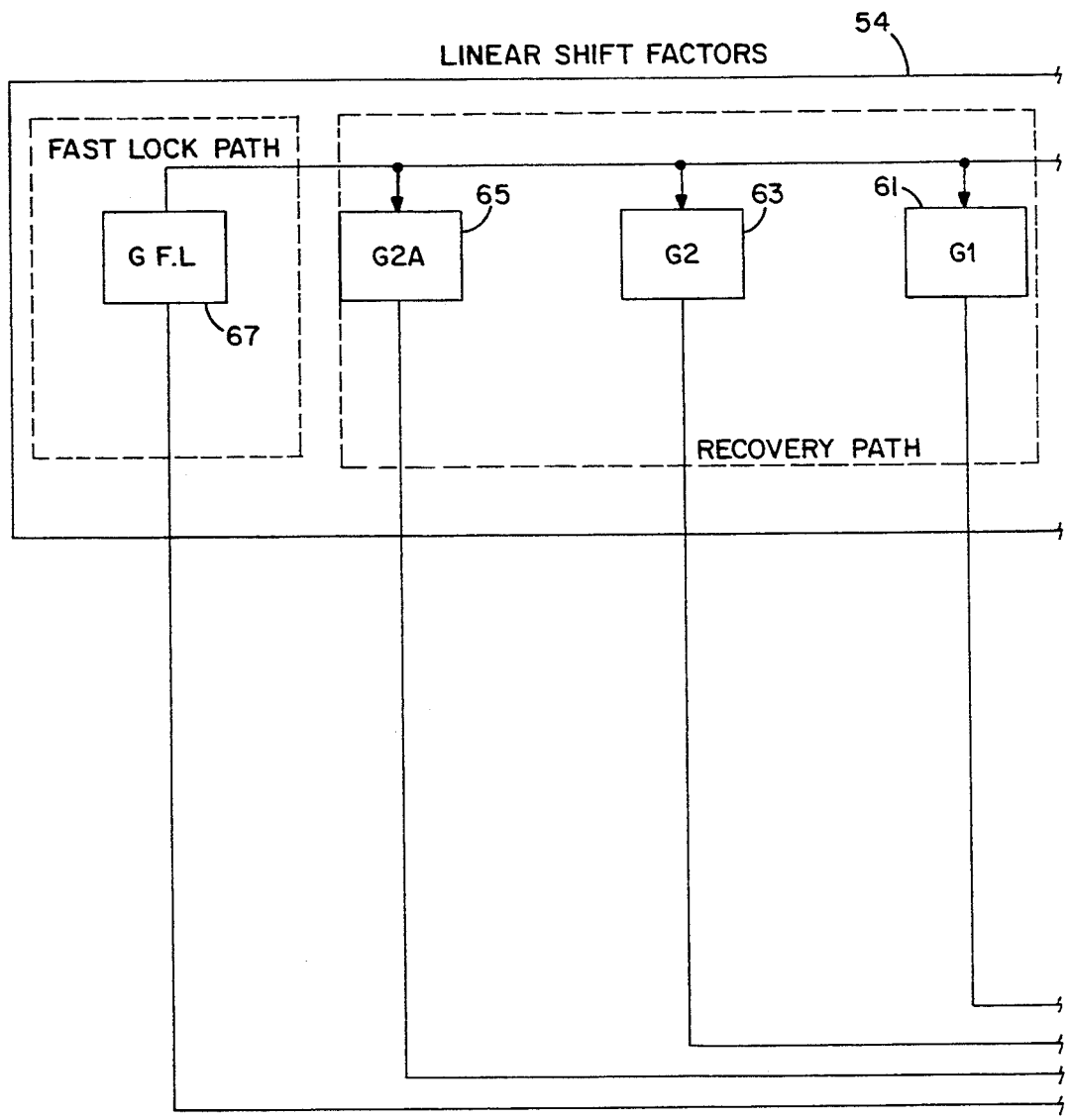
FIGS. 3A and 3B, is a functional block diagram of the leak filter used in the desynchronizer shown in FIG. 1.
Figure 3B:
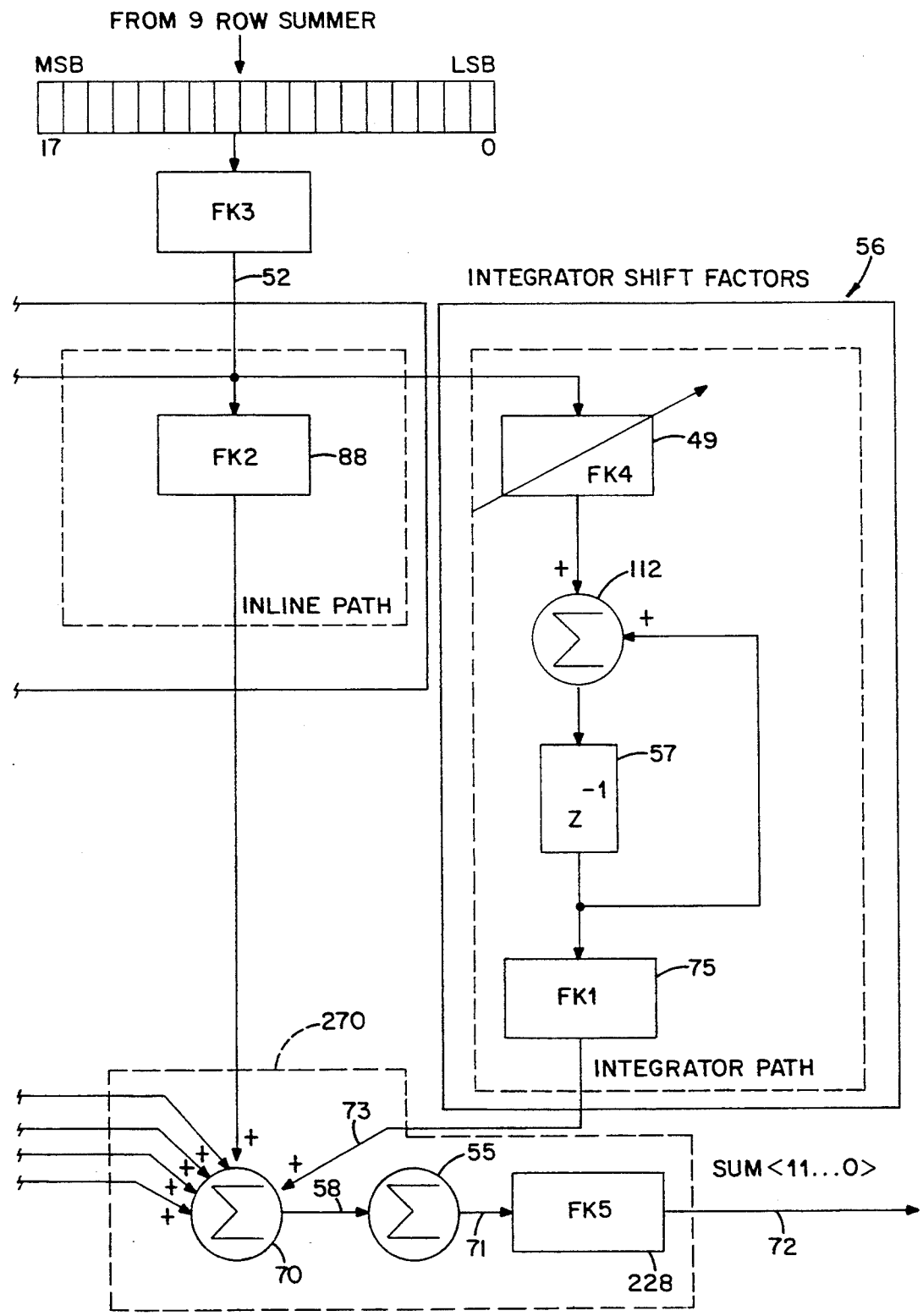
Figure 4A:
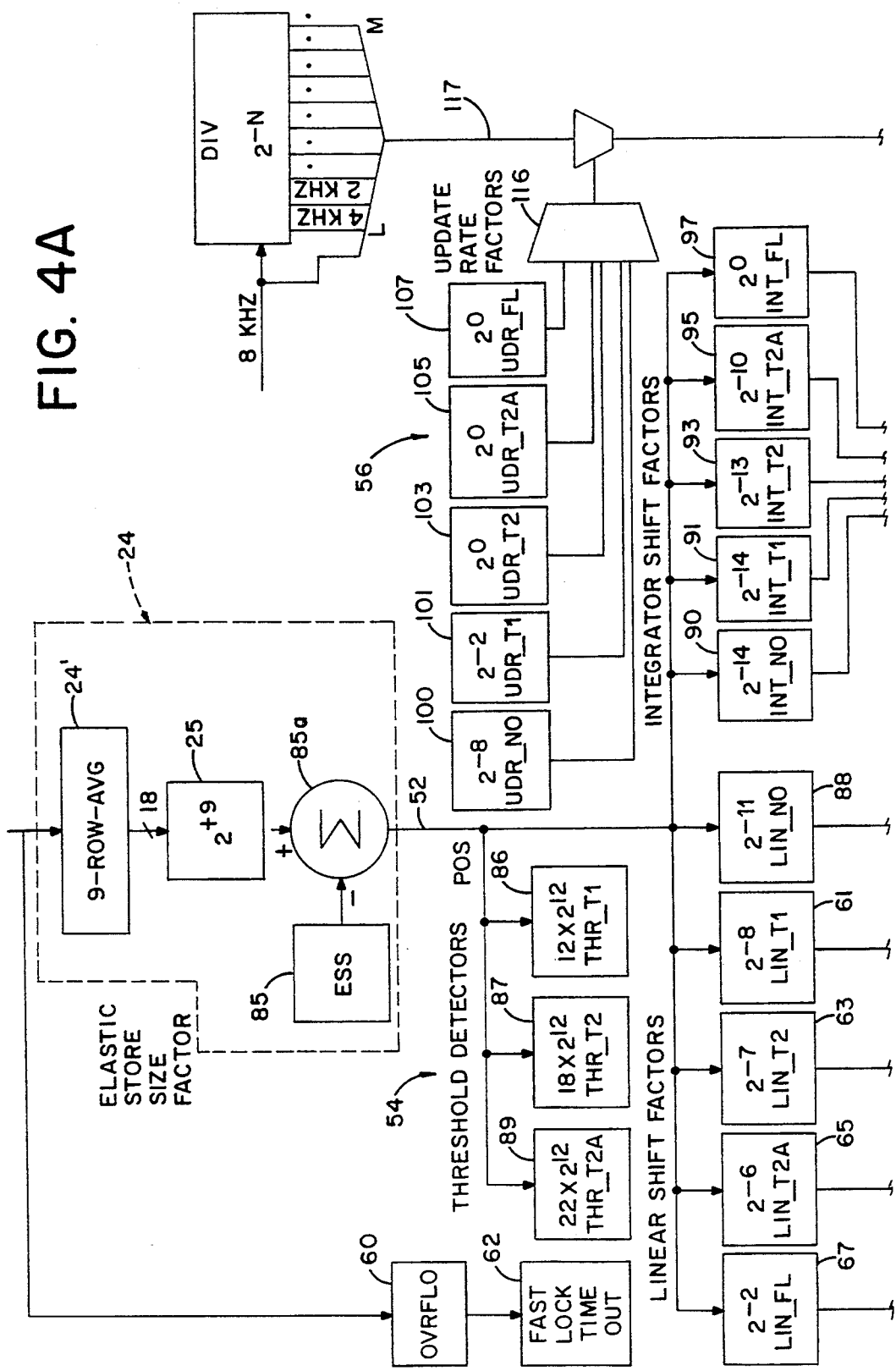
FIGS. 4A and 4B, is a detailed functional block diagram of the leak filter shown in FIG. 3.
Figure 4B:
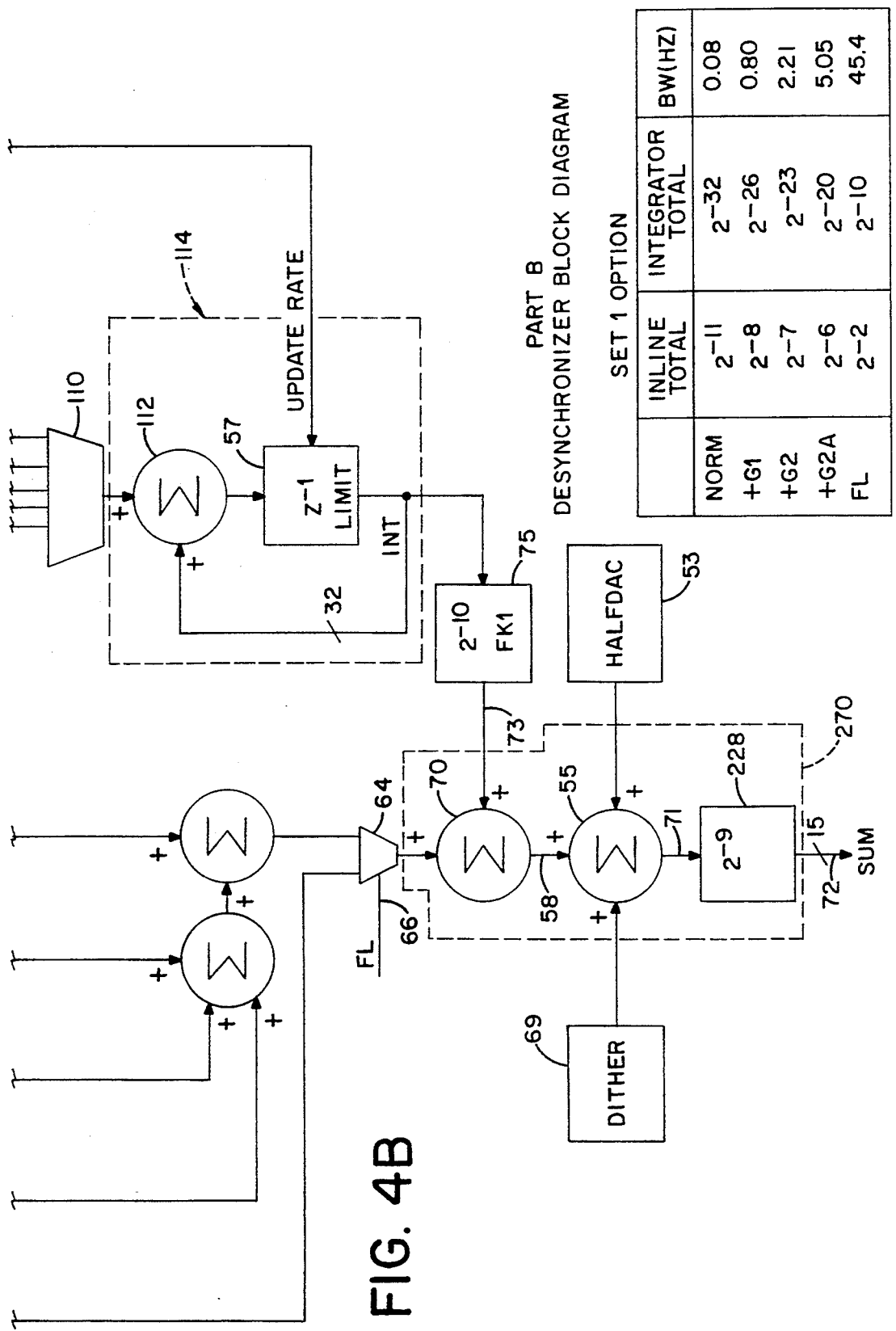
Figure 5A:
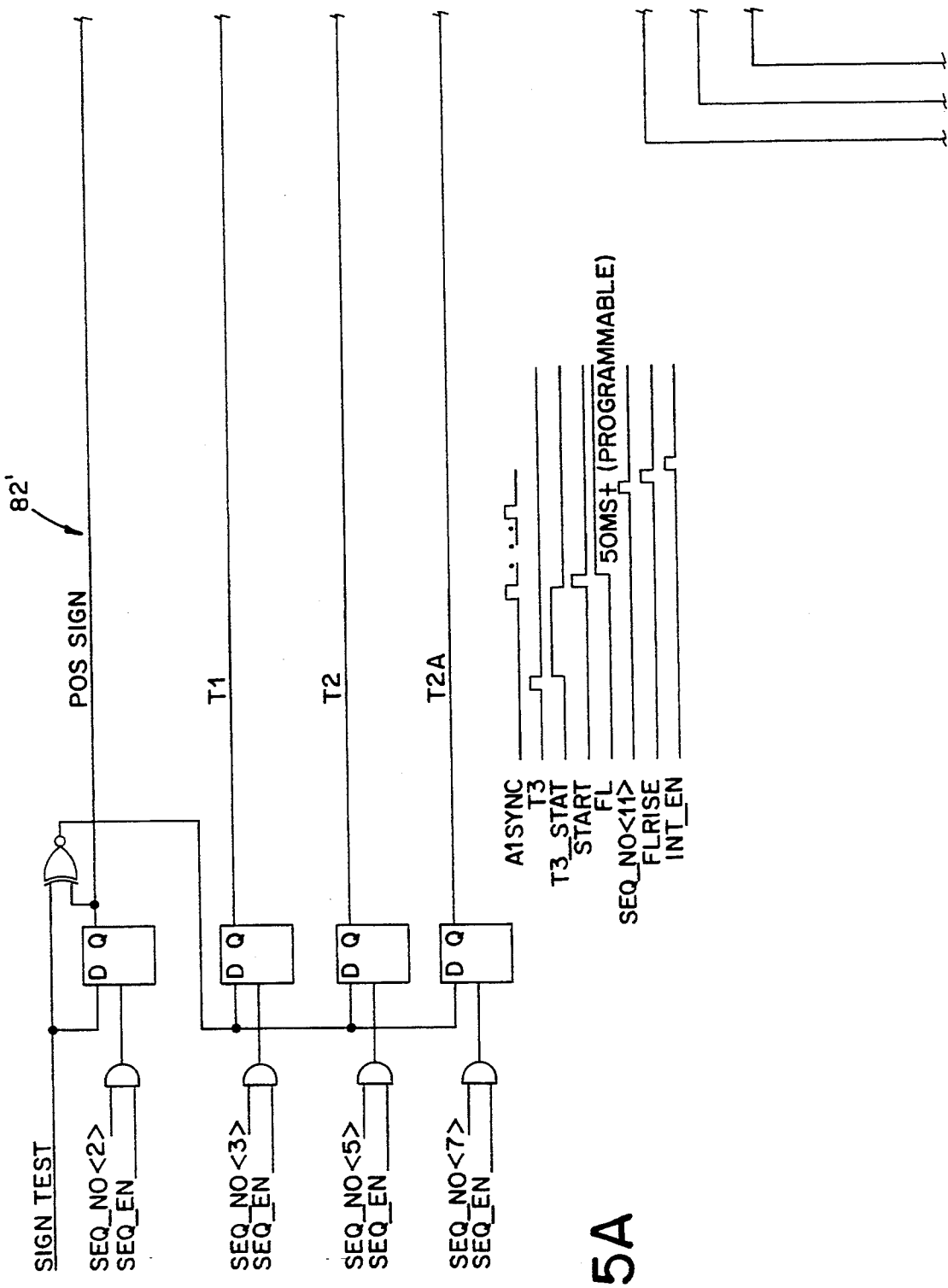
Figure 5C:
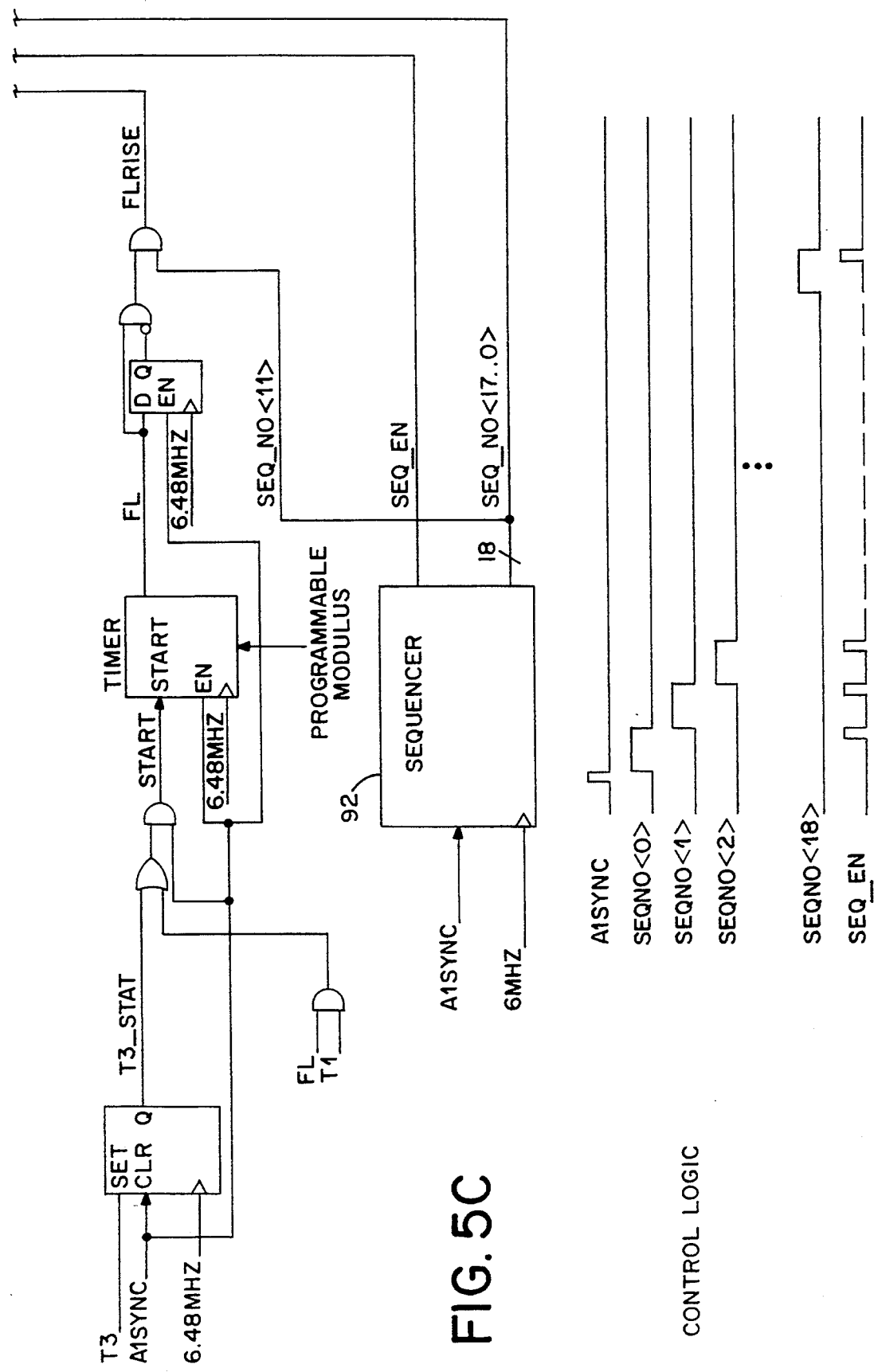

As is well-known in the art, since the adoption of SONET as described in Digital Hierarchy—Optical Interface Rates and Formats Specification (SONET), ANSI TI.105-1991, and its European counterpart, the CCITT SDH, a standard has existed for the synchronous transport of digital signals, such as DS-1 or DS-3 signals within the synchronous payload envelope (SPE) of the synchronous transport envelope (frame). Since the SPE does not reside at a fixed byte location within the synchronous frame, but in fact may move as required, by means of pointer adjustments, within the non-overhead bytes of the synchronous frame as seen in FIG. 1, it is necessary that a means be provided for extracting the clock associated with the digital signal stored within the SPE. The SONET and other synchronous transport standards provide for pointer movement, including a periodic pointer action byte (SONET H3 byte) for adjusting the fill of pointer processor buffers.

The task is therefore to extract the data bytes from the non-dam synchronous overhead bytes and store this incoming periodically discontinuous data stream in a buffer (elastic store) and to extract this data at a rate as close .as possible to its original rate (payload clock or read clock), while accommodating for shifts in the instantaneous incoming data rate as a result of such pointer adjustment and asynchronous stuff bits associated with the payload data itself. This latter requirement is complicated by the need to maintain minimal variation in the payload clock rate, since changes in this clock rate are undesirable. It is of course further necessary that such smooth adjustments in the read clock rate occur at a rate that prevents overflow or underflow of the input buffer (elastic store).

Figure 2:
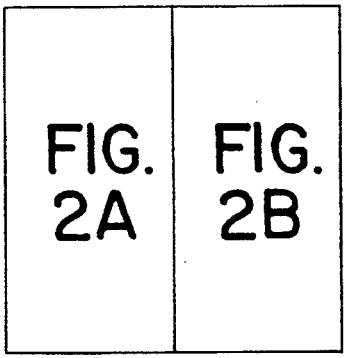
FIG. 2, comprising

The present invention as best seen in FIG. 2, achieves this desired result by a desynchronizer 20 which comprises an elastic store 22, a nine row averager 24, a leak filter 26, a limiter 28, a pulse width modulation circuit acting as a digital to analog converter 30 and a parallel to serial divide by 8 module 32, all of which can be preferably fabricated as an application specific integrated circuit (ASIC). The overall desynchronizer also incorporates an AC to DC converter 34 and a voltage controlled crystal oscillator (VCXO) 36, the latter two modules typically fabricated on a printed circuit assembly associated with the ASIC fabricated modules. The specific design shown in FIG. 2 is specifically directed to a desynchronizer for desynchronizing a DS-3 or DS-1 signal from a received SONET signal. The design however is applicable to any synchronous network which uses a payload envelope for containing a digital signal.

As seen in FIG. 2, incoming serial data is received on line 40 at input 41 with clock information received on line 42 at input 31 and gapping information on line 44. Gapping information is provided so that only data bytes associated with the digital signal are stored within the elastic store. The data is stored in the elastic store as 64 words each 8 bits in length. A read clock signal on line 46 is presented to read clock input 33 and the write and read addresses are respectively output on lines 35 and 37.

The essence of the desynchronizer operation is of course, to read data from the elastic store based upon a read clock signal on line 46 so as to transfer the parallel data to a parallel/serial converter 32 as received on bus 48. The output of the parallel/serial converter is a serial bit stream on output 50 (such as a DS-3 signal) which is then used by any interconnected device. In the example shown, the data is a DS3 signal extracted from an incoming SONET signal on line 40. However, because of pointer adjustments, asynchronous bit stuff information and other variations in the incoming clock signal on bus 40, the desynchronizing of the DS3 signal must account for the variations in the rate of the received data. The elastic store thus provides the physical medium for storing incoming data so that the proper data can be extracted therefrom as smoothly as possible.

The desynchronizer operates as a phase-locked loop (PLL) which comprises four primary components, a phase detector comprising elastic store 22 and 9-row averager 24, the leak filter 26, the VCXO 36, and the parallel/serial divider 32.

The phase detector 23 comprises elastic store 22 and 9-row averager 24. The output of the 9-row averager is the scaled phase difference between the write and read clocks determined from the elastic store write and read addresses. The 9-row averager output 52 thus represents the difference between the rate data is being written into the elastic store and the rate it is being read from the elastic store. It is referred to herein as the W-R value. By averaging nine rows, this difference is computed over an entire synchronous frame. It is important to average over an integral number of rows since the jitter pattern repeats every row. The gain from the 9-row averager is a function of the number of 26 MHz clock periods in an 8 KHz frame time (125 microseconds). The output 52 of the 9-row averager is a normalized write address minus read address multiplied by the number 26 MHz clock cycles in the 8 KHz frame time. This results in a gain of 3240 counts per byte or 405 counts per bit which can also be represented as 405/(2*PI) counts/radian.

Leak filter 26 is the device which causes modification of the read clock rate associated with elastic store 32 (DS3 byte clock 46). The bandwidth of the leak filter is determined by the coefficients used within leak filter branches 54 and 56. Table 2 sets forth the bandwidth of the in-line linear branch 54 based upon the operating mode of the leak filter as discussed later.

TABLE 2

| OPERATING MODE | SET 1 OPTION | SET 2 OPTION |
| --- | --- | --- |
| Normal | .0886 (Hz) | .17 (Hz) |
| T1 | .80 (Hz) | 1.06 (Hz) |
| T2 | 2.21 (Hz) | 2.48 (Hz) |
| T2a | 5.05 (Hz) | 5.316 (Hz) |
| Fast Lock | 45.4 (Hz) | 45.4 (Hz) |

The peaking of the leak filter transfer function is controlled by the location of the pole from the integrator module 56.

There is also a programmable down counter used to implement the D/A converter 30. The gain of this section is determined from the number of 26 MHz clock cycles in the 8 KHz period and the maximum output voltage, such as 5 volts per 3,240 counts. Since the VCXO 36 requires a bi-polar input with no DC offset, there is an external filter 34 to add gain and offset to the output of the D to A converter 30. This filter 34 has a gain of 2 with a minus 5 volt offset. It also incorporates two poles at 400 hertz so as to attenuate the 8 KHz fundamental frequency component from digital to analog converter 30. The VCXO 36 is a discrete implementation having a gain of 5731 radians/seconds/volt maximum and 4776 radians/seconds/volt minimum.

As is readily apparent to those of ordinary skill in the art, any modifications to the gain of any of the components within the desynchronizer must be compensated by a change in the coefficients in the bit leaking circuitry so as to maintain the proper bandwidths for minimal jitter.

Detailed Block Description

Figure 3:
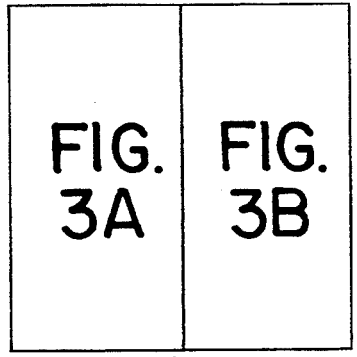
FIG. 3, comprising
Figure 4:
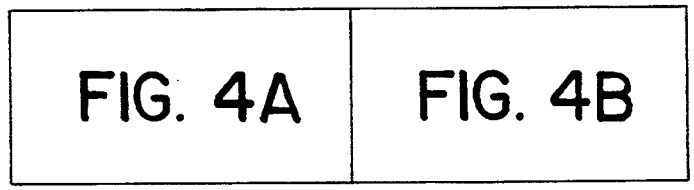
FIG. 4, comprising

The desynchronizer bit leaking capability is shown in increasing detail in FIGS. 3 and 4. As shown generally in FIGS. 3, 4, 11 and 12, the linear branch 54 of the leak filter has a nominal gain factor 88 and three increasing gain factors 61 (G1), 63 (G2) and 65 (G2A) which are successively added at summer module 270 that comprises summers 70 and 55 and a $2^{-9}$ (FK5) module 228, as corresponding W-R threshold values 86 (THR_T1), 87 (THR_T2) and 89 (THR_T2A) are exceeded. Output 58 of summer 70 also includes the integrator branch output 73. This output is a result of integrator module 114 comprising summer 112, storage register 57 and output shifter 75. Gate 110 selects one of the integrator shift factors 90, 91, 93, 95 or 97 and corresponding update rate factors 100, 101, 103, 105 and 107 based upon the presence or absence of W-R thresholds 86, 87, 89 and 60. Gate 116 selects the appropriate update rate factor which in turn causes a specific update rate from clock signal 117 to be presented to storage register 57. (The integrator consists of the integrator shift factors 90, 91, 93, 95, 97, the selector 110, the adder 112, and the register 57, as well as the output scaling factor 75.) The integrator branch thus provides a long-term storage of the payload read clock frequency. The filter when combined with the VCXO transfer function yields an overall type 2 PLL design. (Type 2 means 2 poles at 0 frequency; one from the VXCO, and one from the integrator.) The disclosed shift factor constants are chosen to limit peaking to a value less than 0.1 dB for the closed loop phase response. It should be noted that integrator shift factor module 49 shown in FIG. 3 is a composite of the integrator shift factors and update rate factors.

Additional Desynchronizer Implementation Features

It should be noted that the 23-bit sum which is generated by the leak filter (26) is forced to an output equal to 3240 if the sum is greater than 3240 and to 0 if the sum is negative. All sums between 0 and 3240 are passed by the limiter (28) unchanged.

The D/A converter 30 is actually a decrement counter which functions as a digital to analog converter so as to generate an analog representation of the elastic store fill position. The output value of the limiter 28 is loaded into the counter at the beginning of each frame period. Once the counter has loaded the output signal, HALFUL* goes low and remains low until the counter reaches a terminating count of 0. The counter decrements at a 26 MHz clock rate. If for example the value loaded into the desynchronizer was 1621, the value of HALFUL* would be low for 1,621 clock cycles and high for 1,619 clock cycles, indicating that the elastic store was just over half full. If the value of TXES representing the store position of the elastic store is half full, then the write minus read difference is 32. That is, $32 \times 3240 = 103,680$. The value of 103,680 divided by 64 is 1,620. Therefore, the output, HALFUL*, is low for 1,620 clock cycles and high for 1,620 clock cycles, which is exactly half full. The loop filter is required to generate a true analog signal. The analog signal controls the external VCXO 36 which provides the clock rate for the DS3 byte clock 46. The byte clock 46 in turn is used to read the data out of the elastic store.

As seen in FIG. 4, dither module 69 generates a 5 bit resolution pseudo random number which is input to summer 55. This random number provides for interpolation between the least significant bits of leak filter output 58 which results in increased resolution of the desynchronizer when operating near the center of the elastic store (W−R≈O).

In addition, the HALFDAC module 53 is input to summer 55 to provide a value to the system when the integrator branch is initialized. The HALFDAC value represents the nominal frequency of read clock 46 (see FIG. 2) based upon the specification of the digital signal being extracted (e.g. a 44,736 mb/sec+20 ppm for a DS-3 signal).

The desynchronizer thus performs the primary functions as set forth in Table 3.

TABLE 3

1) Selects the proper threshold values and shift factors.
2) Detects threshold crossings which in turn control the path flow through the desynchronizer.
3) Provides the linear path transfer function.
4) Provides the integrator path transfer function.

Figure 11:
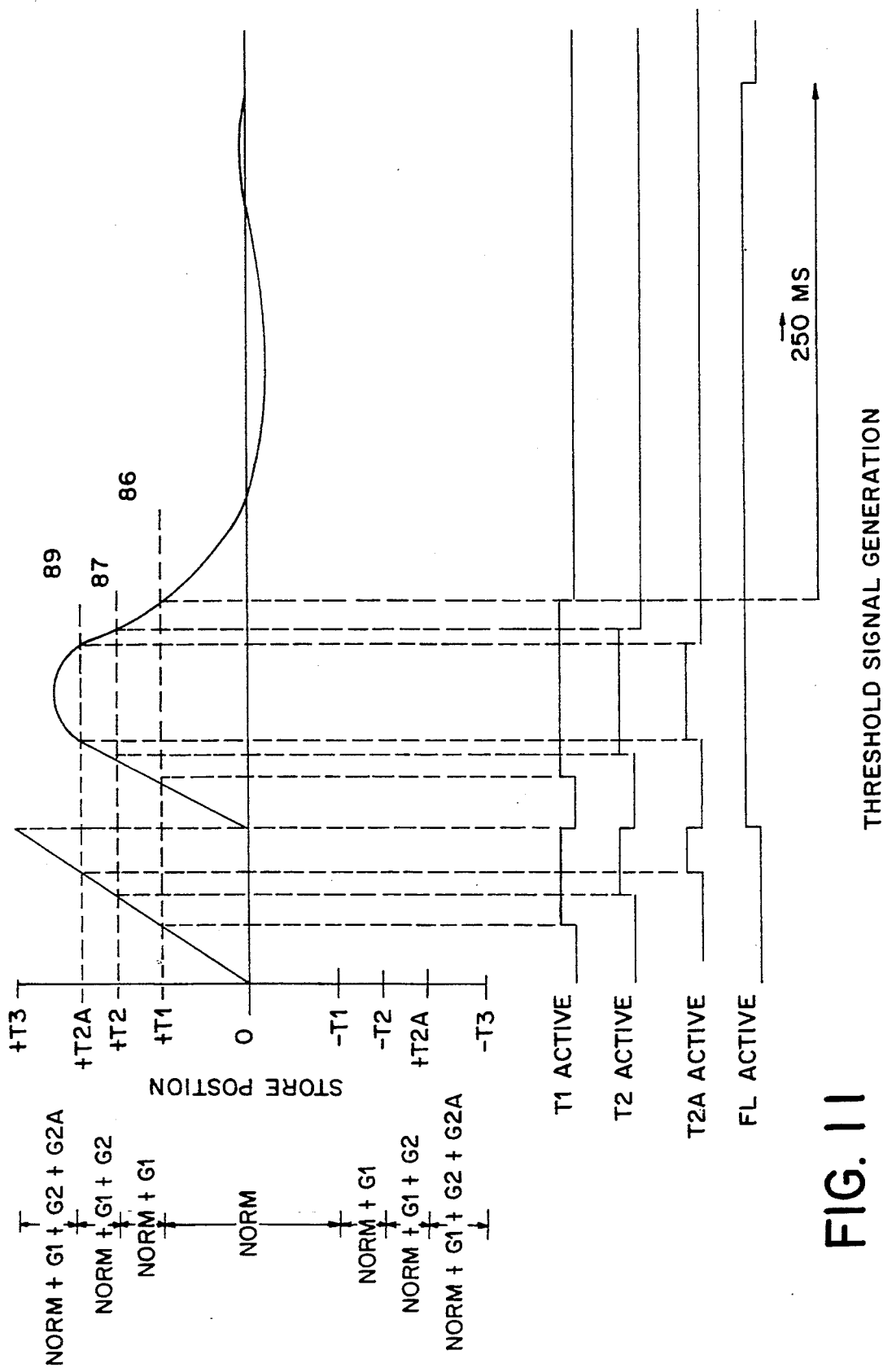
FIG. 11 illustrates waveforms associated with the threshold signal generation, in particular showing the relationship between time and phase response versus various thresholds.
Figure 12:
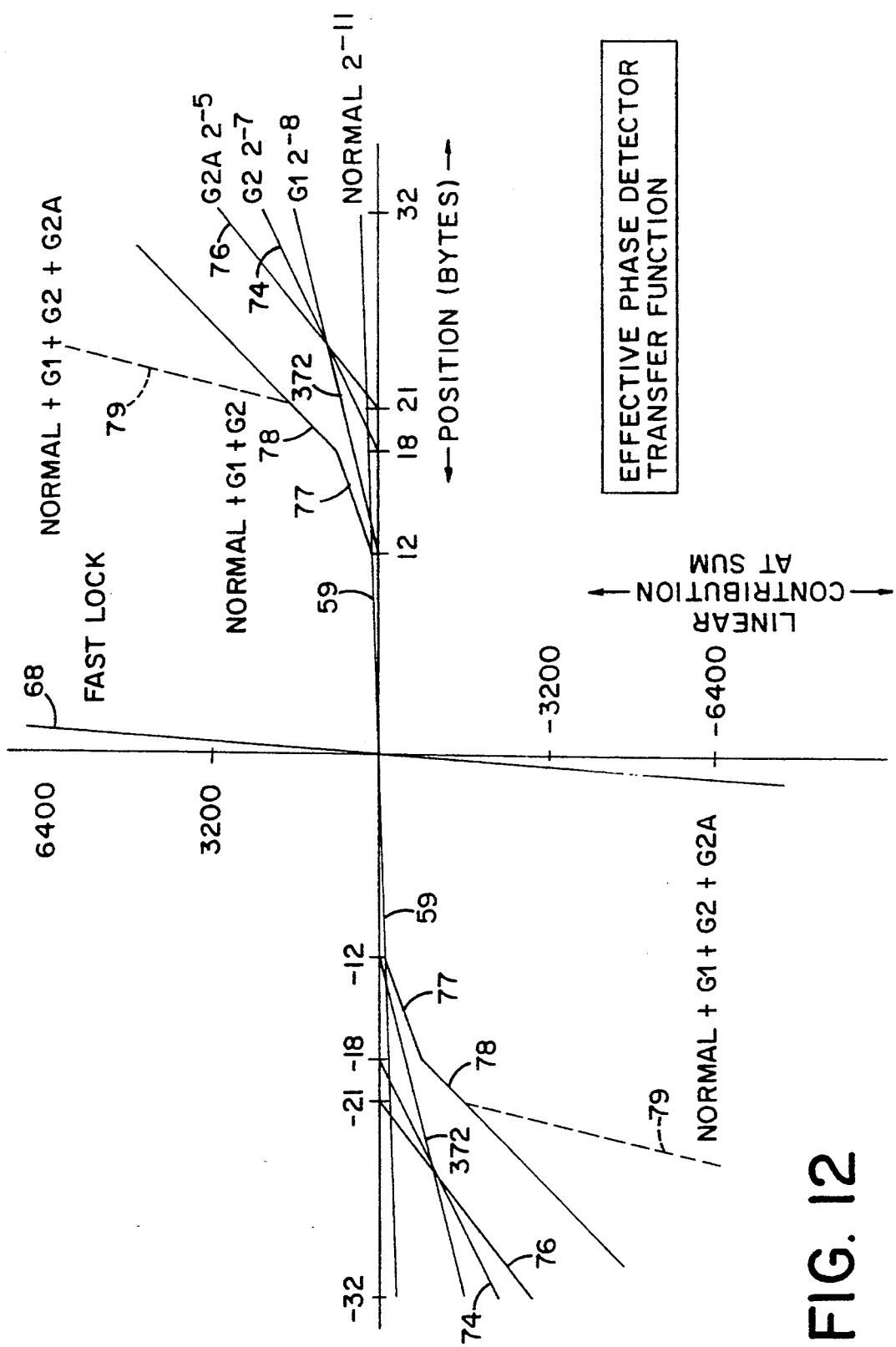
FIG. 12 is a diagram illustrating the effective phase detector transfer function associated with the desynchronizer.

It is readily apparent by review of FIGS. 3, 4, 11 and 12, that as the value of W-R increases, indicative of pointer adjustments and other changes in the write rate for the incoming data to the elastic store, the linear branch linear shift factors (61, 63 and 65) as well as integrator branch integrator shift factors (91, 93 and 95) and update rate factors (101, 103 and 105) associated with the integrator branch 56 are adjusted from their respective nominal values (88, 90 and 100) so as to force the W-R value to decrease in a manner so as to cause minimal output jitter on the output data from parallel to serial divider module 32 on output line 50. As also seen in FIGS. 3, 4, 11 and 12, when an overflow or underflow condition occurs such as detected by module 60, a fast lock timeout signal is generated from module 62 which as transferred to gate 64 via output line 66 causes the fast lock linear shift factor 67 to be input to summer 70. Similarly, for integrator branch 56, the integrator fast lock shift factor 97 is selected by gate 110 for presentation to summer 112, of integrator 114, while gate 116 selects the fast lock update rate factor 107 for changing the update rate of integrator 57. With these shift factors, a very high gain, high bandwidth PLL is implemented so as to quickly bring the read clock rate near to the write clock rate. Transfer line 68 in FIG. 12 shows the resulting transfer function. Of course, during such overflow or underflow conditions, some data within the payload will be lost as the elastic store is re-centered.

FIG. 12 also shows the addition of the normal transfer line 59 with the G1 transfer line 372, the G2 transfer line 74 and the G2A transfer line 76, resulting in higher gain for the linear branch as increasing thresholds are detected as defined by the magnitude of the W-R value on output 52. A combination of these transfers for the G1 plus G2 thresholds is shown by composite transfer line segment 78, whereas line segment 77 shows the combination of the normal plus G1 gains and line segment 79 shows the transfer function of the normal plus G1 plus G2 plus G2A gains.

A definition of the inputs associated with the desynchronizer are set forth in Table 4 while the outputs generated by the desynchronizer are defined in Table 5.

TABLE 4

| DESYNCHRONIZER INPUT SIGNAL DESCRIPTION | |
|---|---|
| ACM<17..0> | Output of 9 row averager block. This is the phase detector output of the awsmit elastic store. |
| A1SYNC | This input, when active, will mark the start of an STS-1 frame, and synchronizes events in the calculation engine. |
| T1_UP<7..0> | This is Threshold value #1. This threshold value is used when CPUEQPT* is low. |
| T2_UP<7..0> | This is Threshold value #2. This threshold value is used when CPUEQPT* is low. |
| T2A_UP<7..0> | This is Threshold value #2a. This threshold value is used when CPUEQPT* is low. |
| T3 | This input signal flags whether or not the phase detector output has crossed threshold #3. When T3 = 1, system has overflowed. |
| INT_NOMSHFT_UP<3..0> | This variable shift factor is used when the loop is in nominal mode. It is selected when CPUEQPT* is low during the Integrator path calculation. |
| INT_T1SHFT_UP<3..0> | This variable shift factor is used when the normalized phase detector output exceeds Threshold #1. It is selected when CPUEQPT* is low during the Integrator path calculation. |
| INT_T2SHFT_UP<3..0> | This variable shift factor is used when the normalized phase detector output exceeds Threshold #2. It is selected when CPUEQPT* is low during the Integrator path time slot. |
| INT_T2ASHFT_UP<3..0> | This variable shift factor is used when the normalized phase detector output exceeds Threshold #2A. It is selected when CPUEQPT* is low during the Integrator path time slot. |
| INT_FLSHFT_UP< 3..0> | This variable shift factor is used when the system is in fastlock mode. It is selected when CPUEQPT* is low during the Integrator path time slot. |
| LIN_NOMSHFT_UP<3..0> | This variable shift factor is used when the system is in nominal mode. It is selected when CPUEQPT* is low during the Linear path time slot. |
| LIN_T1SHFT_UP<3..0> | This variable shift factor is used when the normalized phase detector output exceeds Threshold #1. It is selected when CPUEQPT* is |

TABLE 4-continued
DESYNCHRONIZER INPUT SIGNAL DESCRIPTION

| | |
|---|---|
| | low during the Linear path time slot. |
| LIN_T2SHFT_UP<3..0> | This variable shift factor is used when the normalized phase detector output exceeds Threshold #2. It is selected when CPUEQPT* is low during the Linear path time slot. |
| LIN_T2ASHFT_UP<3..0> | This variable shift factor is used when the normalized phase detector output exceeds Threshold #2a. It is selected when CPUEQPT* is low during the Linear path time slot. |
| LIN_FLSHFT_UP<3..0> | This variable shift factor is used when the system is in Fastlock mode. It is selected when CPUEQPT* is low during the Linear path time slot. |
| UDR_NOM_UP<3..0> | This input value determines the update rate of the Integrator register in normal mode. This value is used during the Integrator path time slot when CPUEQPT* is low. |
| UDR_T1_UP<3..0> | This input value determines the update rate of the Integrator register when the normal phase detector output exceeds Threshold #1. This shift factor is used during the Integrator path time slot when CPUEQPT* is low. |
| UDR_T2_UP<3..0> | This input value determines the update rate of the Integrator register when the normalized phase detector output exceeds Threshold #2. This shift factor is used during the Integrator path time slot when CPUEQPT* is low. |
| UDR_T2A_UP< 3..0> | This input value determines the update rate of the Integrator register when the normalized phase detector output exceeds Threshold #2a. This shift factor is used during the Integrator path time slot when CPUEQPT* is low. |
| UDR_FL_UP<3..0> | This input value determines the update rate of the Integrator register in Fastlock mode. This variable shift factor is used during the Fast lock path time slot when CPUEQPT* is low. |
| FLTIMER_UP<4..0> | This input value is the fast lock counter time constant. It is used when CPUEQPT* is low. |
| ESS_UP<7..0> | This input value is used to normalized the phase detector output with respect to half the size of the elastic store. It is used when CPUEQPT* is low. |
| BWSEL | This input pin shall determine which of the two sets of hard coded shift factors and threshold values should be selected. This pin is used only when CPUEQPT* is high. |
| CPUEQPT* | This input pin shall determine whether the hard coded values or the microprocessor interface values are to control the desynchronizer. When CPUEQPT* is low the microprocessor values are selected. |
| 32BSEL | This input pin shall select the values dependent on the elastic store size. This pin is used only when CPUEQPT* is high. When 32BSEL is him the phase detector output will be normal with respect to a 32 byte elastic store. |
| RESET | This input signal is used as a synchronous reset to all registers in the desynchronizer. This input is only used for test purposes. |
| PMHLD<8..7> | This input signal is used to update the Integrator (PMHLD<8>) or Position store (PMHLD<7>) working register. The microprocessor interface generates this signal. |
| PMDEC<18..15> | This input signal is used coincident with PMHLD<8..7> to read the high byte/low byte of the respective register. The microprocessor interface generate this signal. |
| LOCLK | 6.48MHZ CLK/ Derived off of 51.84MHz STS-1 CLK |

TABLE 5
DESYNCHRONIZER OUTPUT SIGNAL DESCRIPTIONS

| | |
|---|---|
| OUT<22..0> | The 23 bit desynchronizer output. |
| T1 | This output signal flags the system that the normalized phase detector output has exceeded Threshold #1. |
| T2 | This output signal flags the system that the normalized phase detector output has exceeded Threshold #2. |
| T2A | This output signal flags the system that the normalized phase detector output has exceeded Threshold #2A. |
| EXTDB<7..0> | This bus is the data read from the working Integrator/Position store register destined for the microprocesser interface. |
| A1FLG | This output, when active, will mark the start of an STS-1 frame. |

Operation of the Calculation Engine

Figure 6:
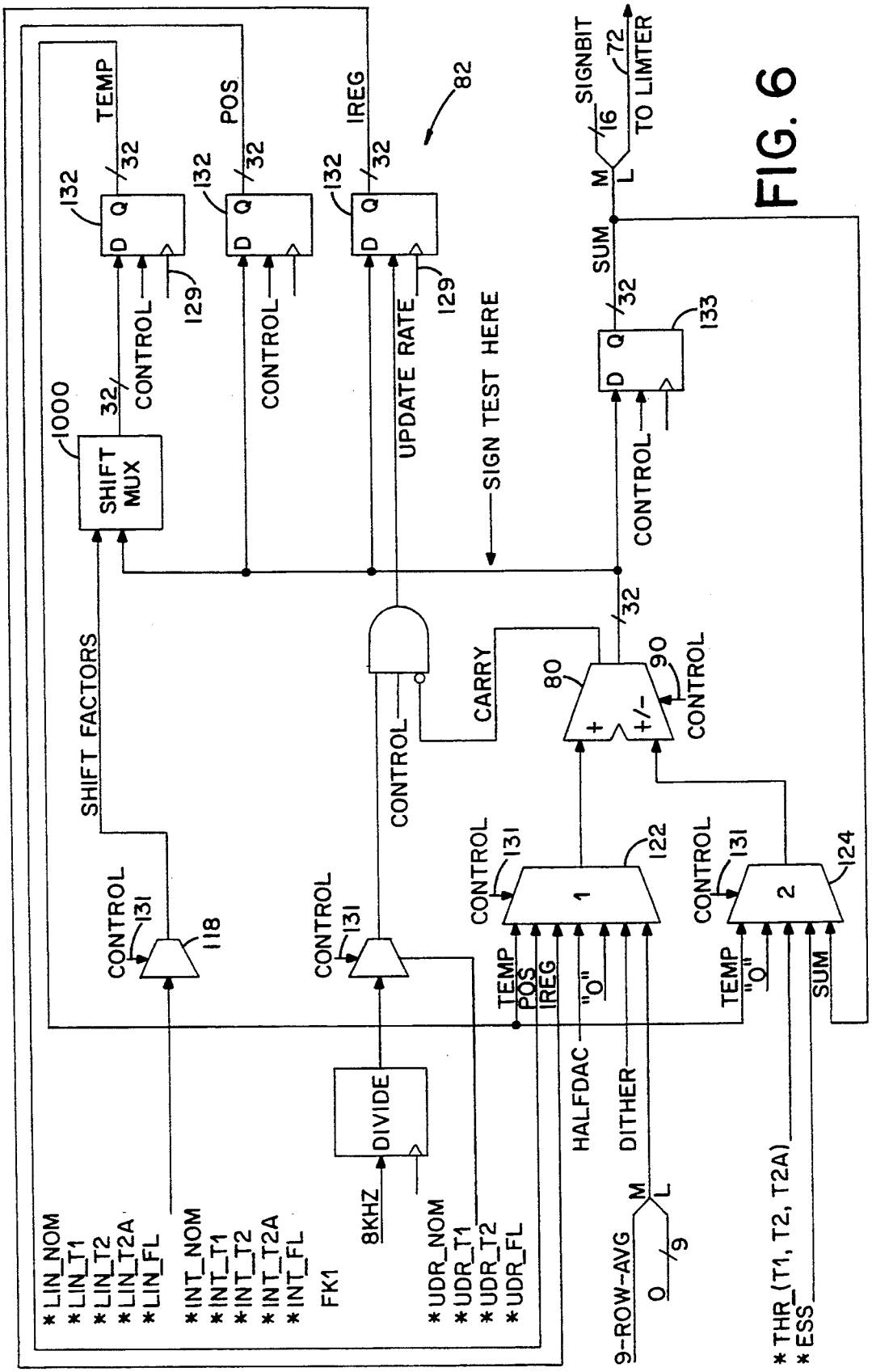
FIG. 6 is a schematic diagram of the iterative calculating portion of the calculation engine.
Figure 9A:
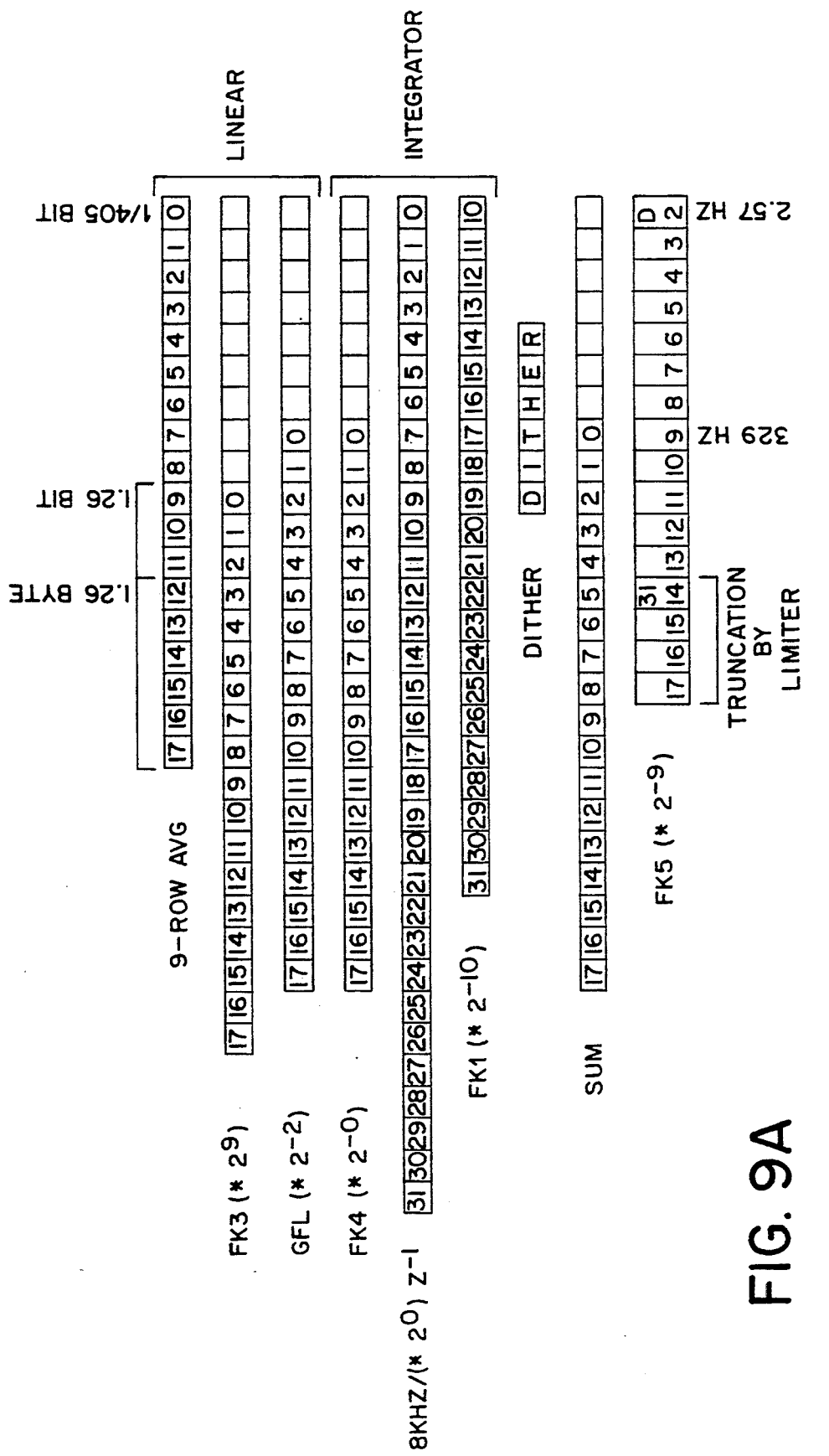
FIGS. 9A and 9B, illustrates the register contents per shift factor for fast lock and normal states.
Figure 9B:
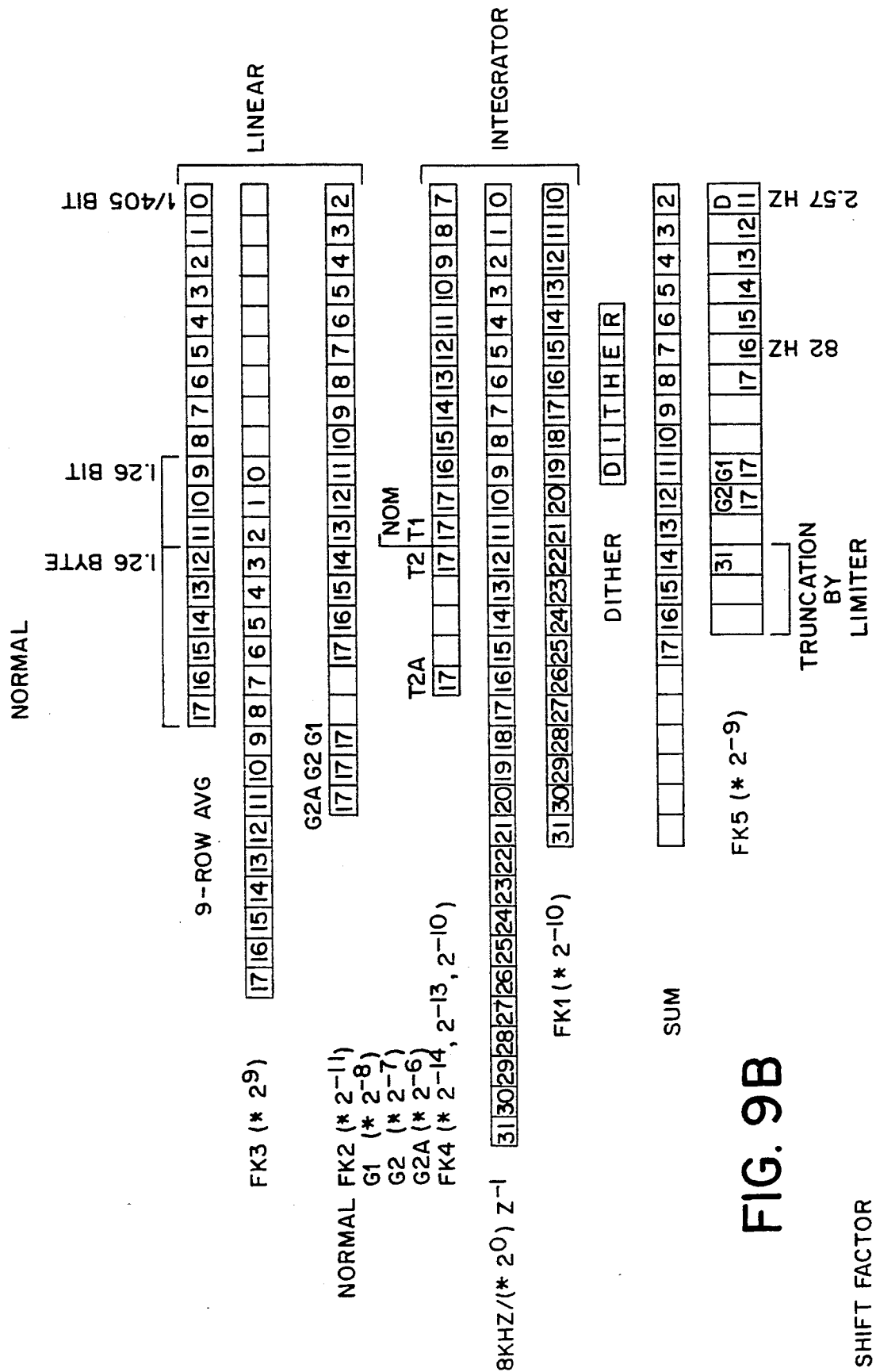
Figure 5:
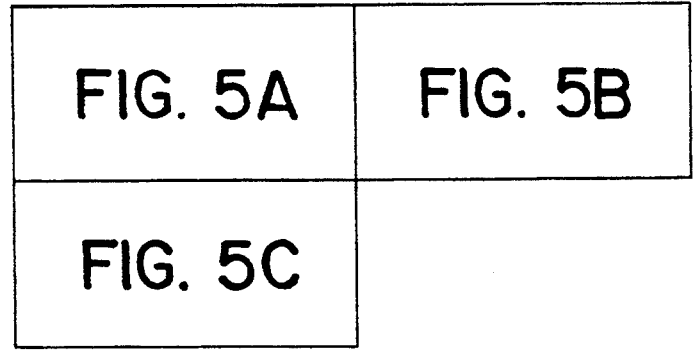
FIG. 5, comprising

The present invention by use of a calculation engine 82' and 82" as shown in FIGS. 5 and 6 is able to perform the functions of the block diagram shown in FIG. 4 with a limited number of hardware modules. The iterative operation of the calculation engine is described in FIG. 6A for each of the event sequences with the column identified as CONDITIONS indicating when that event sequence is performed and the column identified as OTHER FUNCTIONS setting forth what other actions are taken for the execution of that particular sequence. As can be seen in FIG. 6, a single adder 80 is used instead of a plurality of adders as shown in FIG. 4 to obtain the result of FIG. 4. The circuit shown in FIG.

Figure 6A:
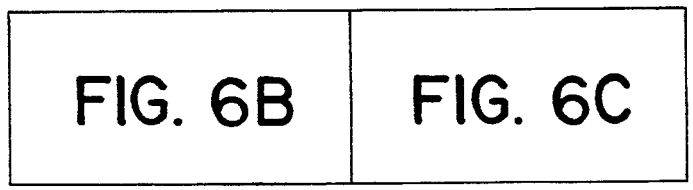
FIG. 6A, comprising

6 as implemented by the steps shown in FIG. 6A, thereby results in a significant reduction in the number of gates necessary for implementation of the bit leaking circuitry shown in FIG. 4. In addition, the calculation engine shown in FIG. 6 is configurable to achieve whatever summing operation and other logic operations are desired. Although the disclosed implementation is for a bit leaker, it is readily apparent that this calculation engine can be configured for other arithmetic and logic operations. Furthermore, although eighteen separate events are calculated to determine the leak filter output value at a given instant of time, since this value only needs to be determined once per frame (125 μsec), there is sufficient time to perform the iterative calculations when operating at a sufficiently high clock rate, such as 6 MHz.

Thus as seen in FIGS. 2, 4 and 6A, the first event sequence (event number 0) takes the output 52 of the 9-row averager as passed through a $2^9$ block 25 (which is part of the 9-row averager module 24 shown in FIG. 2) and subtracts the value identified by the ESS module 85 (elastic store center shift value). The partial output is identified as POS and represents elastic store position relative to the center, and is performed under all conditions. The ESS module provides the ability to have an effectively variable size elastic store, by changing the value of the ESS parameter (85-FIG. 4). This changes the average offset between the read and write clocks in the store, effectively giving a programmable variable sized store (or data delay).

$$ESS = \tfrac{1}{2}[405 \text{ counts/bit} \times 8 \text{ bits/byte} \times 64 \text{ bytes}].$$

Thus, for a 64 byte store, the equation is reduced as follows:

$$ESS = \tfrac{1}{2}[207,360]$$

$$ESS = 103,680.$$

This represents an average delay between the write and read clocks of 32 bytes (as found in FIG. 8A).

If ESS is halved, the average delay would go to 16 bytes—the effective average delay of a 32 byte elastic store.

Also, this parameter is changeable with a system software update, as are all other significant parameters.

In event number one, the value of the POS variable is added to 0 and shifted to the right by the value of LIN_NO variable which is shown by module 88 to be $2^{-11}$. The result is defined as variable TMP (or TEMP). This technique is repeated for the remaining events shown in FIG. 6A. The overall result is the determination of the value for SUM output 72 as shown in FIG. 4. Thus a single adder which can operate as both an adder or a subtractor, depending upon control signal 90 (see below), is iteratively used with the storage of partial results in registers 132 so as to achieve the particular logic functions for obtaining a bit leaking desynchronizer as shown in FIG. 4. The partial product results for the operations shown in FIG. 6A are more fully set forth in FIG. 7.

Calculation Engine Implementation

The leak filter shown in FIGS. 3 and 4 is thus implemented in a recursive fashion so as to avoid separate loops for each adder shown. In a preferred embodiment of the present invention, partial products of the linear and integrator branches are iteratively determined in a loop-like fashion. The synchronizing of the data path flow through the loop is accomplished by a sequencer 92 and associated control logic shown in FIG. 5.

One of the features of the present invention is that all the linear branch and integrator branch shift factors and threshold values are provisionable depending upon particular desired configurations. FIGS. 8A and 8B set forth two sets of values which can be selected in a preferred embodiment of the present invention. FIG. 6 shows that gates 118, 120, 122, and 124, upon receipt of appropriate control signals select the particular shift factors and other inputs required at each sequence event shown in FIG. 6A. The ALU control encoder 126 controls adder 80 by output 90 while the register control encoder 128 generates control signals on outputs 129 that control registers 132. The multiplexer control encoder 130 via control signals on outputs 131 control gates 118, 120, 122, and 124 while register 133 under input control, controls generation of the desired output on line 72.

Figure 7:
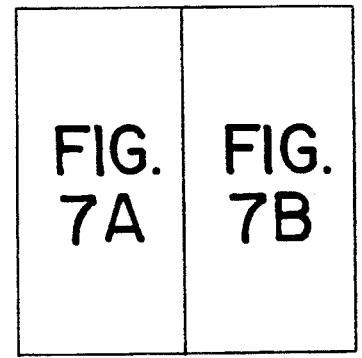
FIG. 7 comprising
Figure 9:
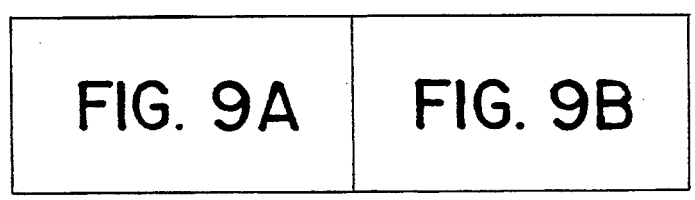
FIG. 9, comprising

Referring to FIG. 5, each gain factor requires two consecutive passes through the loop. The control logic shown in FIG. 5 dictates which of the gain factors are added during a given frame. The event sequence and partial products of the loop are shown in FIGS. 6A and 7 respectively. The sequence is followed on every frame boundary. The contents of the loop register after each shift factor is shown in FIG. 9.

Figure 10A:
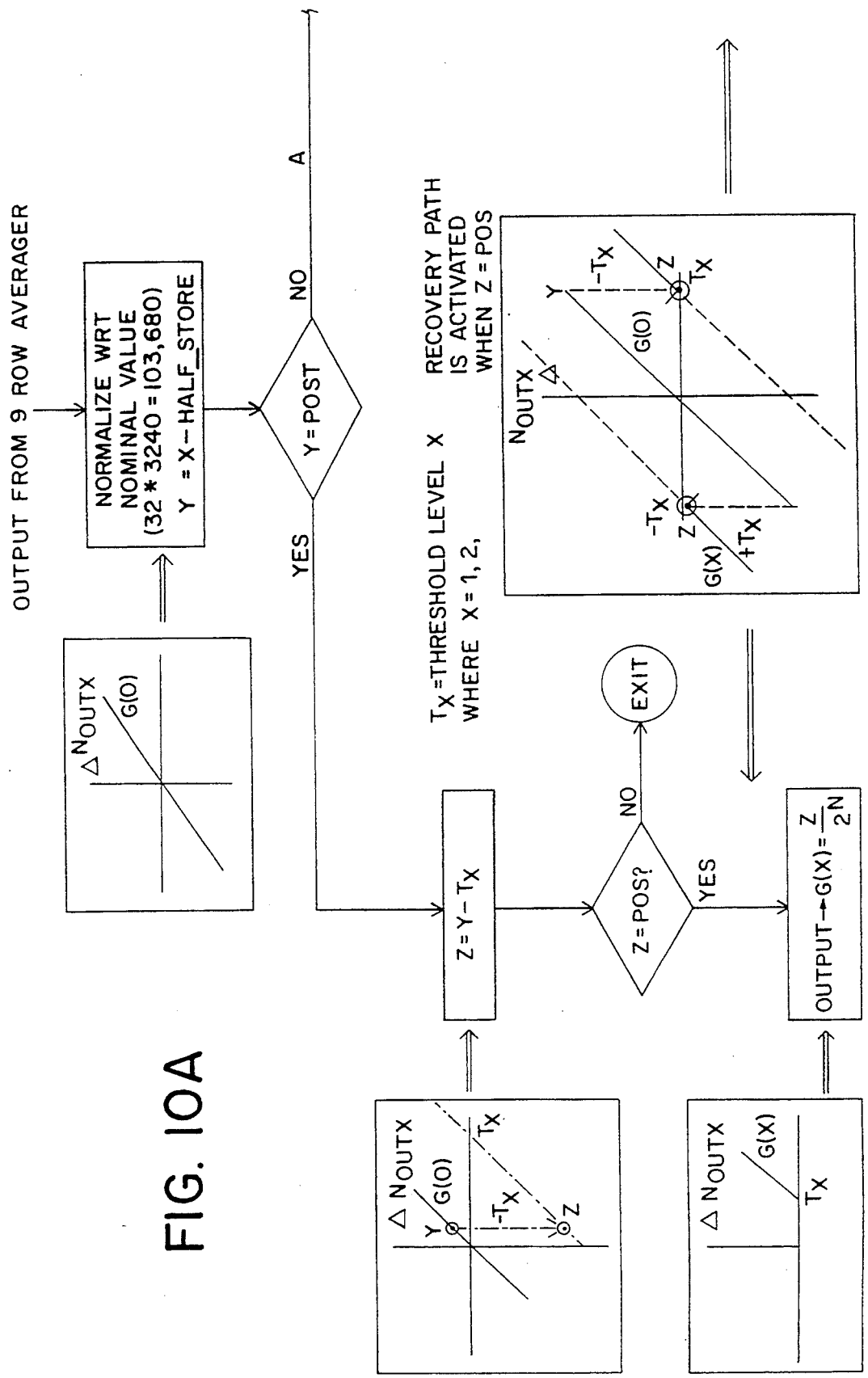
FIGS. 10A and 10B, is a flow diagram of the fault recovery procedure.
Figure 10B:
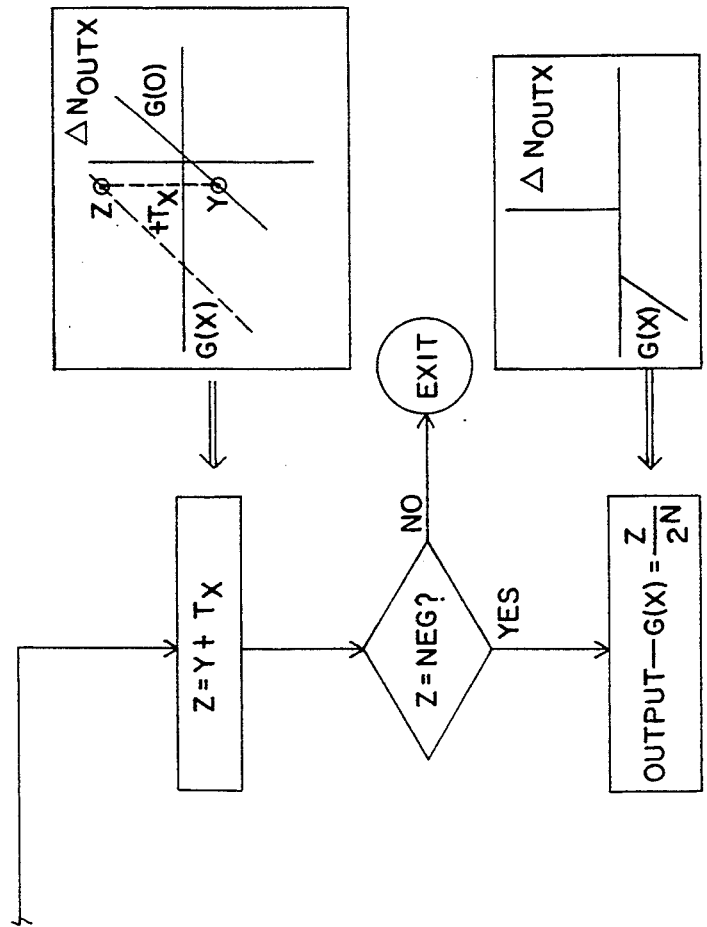

The control logic detects threshold crossings (that is W-R values exceeding predetermined thresholds 86, 87, 89, and 60 shown in FIG. 4) during specific time sequences in a given frame and adds the respective gain factors to the loop. The loop monitors these threshold values, namely; gain 1, gain 2, and gain 2a associated with the corresponding linear branch and integrator branch shift factors. FIGS. 10, 11 and 12 illustrate the behavior of the fault recovery circuit.

It is thus seen that this use of a calculation engine can be used to generate a desired result through iterative calculations provided that the end result can be performed over a period of time greater than that necessary to execute all of the partial events.

Summary

From the foregoing description, it is readily seen that based upon predetermined thresholds, the gain of the bit leaking filter is adjusted so as to minimize the jitter associated with the generated DS3 byte clock signal 46 and as a result, the read data from the elastic store on output 50. With this desynchronizer, jitter on the order of 0.1 to 0.2 unit intervals during pointer events (where one byte equals 8 UI) is easily achievable, or even lower if desired.

Thus what has been described is a desynchronizer for obtaining the read clock associated with a payload data signal, such as a DS3 signal embedded within the synchronous payload envelope of a SONET synchronous frame, so as to accommodate pointer movements and asynchronous stuff bit changes in a manner so as to minimize instantaneous change of the read clock rate and thereby instantaneous change of the output frequency associated with the data signal. Furthermore, the overall bit leaking circuitry is implemented using a calculation engine which minimizes the number of gates needed to perform the required arithmetic and logic functions through use of an iterative addition/subtraction process wherein partial results are stored in registers and combined in a manner so that the overall result is the same as if the circuitry were implemented in a non-time sequential fashion.

It will thus be seen that the objects set forth above and those made apparent from the preceding description are efficiently attained and, since certain changes may be made in the above construction and methodology without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed is:

1. A desynchronizer (20) for smoothing a read clock (46) associated with data from a digital signal transported within a payload envelope of a synchronous communication protocol comprising a plurality of incoming synchronous frames, each frame comprising a plurality of rows of information, in which the payload is stored within a portion of one or more frames and wherein the position of the payload may vary from frame to frame, comprising:

A) an elastic store (22) having a write clock input (31), a read clock input (33), a data input (41), a data output (48), and an input (44) for receipt of information regarding the presence of data on said data input (41), said elastic store having a memory for storing said data as that data is received on the data input at a write data rate, said elastic store generating outputs (35, 37) representative of write and read address values;

B) difference means (24) connected to the write address and read address outputs (35, 37) of the elastic store so as to determine an output (52) (W-R) proportional to the difference between the write and read addresses for a plurality of rows associated with the incoming synchronous frames;

C) a leak filter (26) connected to the output (52) of said difference means (24), the leak filter for generating an output (72) so as to cause an adjustment in a read data rate associated with the elastic store, said leak filter comprising a linear branch (54) connected to the output (52) of the difference means, said linear branch having threshold detector means for comparing the output (52) of the difference means to at least a first threshold (86) so as to determine if said output exceeds said at least first threshold, the linear branch having a first nominal linear shift factor (88) and at least a second linear shift factor (61) selected when the first threshold (86) is exceeded, each linear shift factor for adjusting the gain of the linear branch, and an integrator branch (56) connected to the output (52) of the difference means having a first nominal integrator shift factor (90) and at least a second integrator shift factor (91) selected when said first threshold is exceeded, each integrator shift factor for adjusting the gain of the integrator branch and thus the value of the W-R output, and further wherein the integrator branch has an integrator register (57) selectably connected to the W-R output as passed through one of the integrator shift factors for repetitively integrating said W-R output, said leak filter further comprising an output summer module (270) for combining the outputs of the linear branch and integrator branch for providing a leak filter output (72); and D) means (28, 30, 34, 36, 32) for converting the output (72) of the leak filter into a variable frequency rate (46) as determined by the value of the leak filter output so as to read data from the elastic store; whereby the read data rate approximates the average write data rate and the change in the read data rate is minimized for changes in the average write data rate and the rate of change in the read data rate is increased as the detected threshold is exceeded.

2. A desynchronizer as defined in claim 1, wherein the integrator branch includes a nominal update rate factor (100) and at least a second update rate factor (101) selected when the first threshold (86) is exceeded, each rate factor for adjusting the integrator rate of the integrator branch.

3. A desynchronizer as defined in claim 2, wherein the linear shift factor, integrator shift factor and update rate shift factors are changed as the W-R output exceeds at least one separate threshold value (86) so that the rate at which the rate of change of the read clock changes is increased as each higher threshold value is exceeded.

4. A desynchronizer as defined in claim 3, wherein a fast lock mode linear shift factor (67), integrator shift (97) and update rate (107) factors are enabled when a fast lock threshold (60) indicative of elastic store near overflow or near underflow is exceeded, these factors causing the linear branch and integrator to have much higher gains than otherwise so as to quickly adjust the read rate when such a near overflow or near underflow condition occurs, and where said fast lock mode persists for a predetermined time.

5. A desynchronizer as defined in claim 1, further comprising a fast lock threshold (60) indicative of a near elastic store overflow or a near elastic store underflow, wherein a fast lock mode linear shift factor (67), integrator shift factor (97), and update rate factor (107) are enabled when the fast lock threshold (60) is exceeded, these factors causing the linear branch and integrator branch to have much higher gains than otherwise so as to quickly adjust the read rate when such a near overflow or near underflow condition occurs, and where said fast lock mode persists for a predetermined time.

6. A desynchronizer as defined in claim 1, wherein the leak filter (26) has means for provisioning the linear branch shift factors and the integrator branch (56) shift factors.

7. A desynchronizer (20) as defined in claim 1, wherein the linear branch and the integrator branch of the leak filter comprise means for maintaining the output (72) continuous when the first threshold is exceeded.

8. A desynchronizer as defined in claim 1, wherein the memory of the elastic store comprises N locations, where N is a positive integer greater than two and wherein the center position of the elastic store is the midpoint of the N locations, and wherein the first threshold is symmetrically positioned about the center position of the elastic store.

9. A desynchronizer as defined in claim 8, wherein there are M thresholds, where M is an integer greater than one, and there are M+1 shift factors for the linear branch (54) and for the integrator branch (56) of the leak filter (26) so as to increase the bandwidth of the leak filter and thereby minimize the probability of elastic store overflow or underflow as the position away from the elastic store center position increases and further where N is at least equal to 2M+1.

10. A desynchronizer (20) as defined in claim 9, wherein the linear branch and the integrator branch of the leak filter comprise means for maintaining the output (72) continuous when each threshold is exceeded.

11. A desynchronizer (20) for smoothing a read clock (46) associated with data from a digital signal transported within a payload envelope of a synchronous communication protocol comprising a plurality of incoming synchronous frames, each frame comprising a plurality of rows of information, in which the payload is stored within a portion of one or more frames and wherein the position of the payload may vary from frame to frame, comprising:
  A) an elastic store (22) having a write clock input (31), a read clock input (33), a data input (41), a data output (48), and an input (44) for receipt of information regarding the presence of data on said data input (41), said elastic store having a memory for storing said data as that data is received on the data input at a write data rate, said elastic store generating outputs (35, 37) representative of write and read address values;
  B) difference means (24) connected to the write address and read address outputs (35, 37) of the elastic store so as to determine an output (52) (W-R) proportional to the difference between the write and read addresses for a plurality of rows associated with the incoming synchronous frames;
  C) a leak filter (26) connected to the output (52) of said difference means (24), the leak filter for generating an output (72) so as to cause an adjustment in a read data rate associated with the elastic store, said leak filter comprising a linear branch (54) connected to the output (52) of the difference means, said linear branch having threshold detector means for comparing the output (52) of the difference means to at least a first threshold (86) so as to determine if said output exceeds said at least first threshold, the linear branch having a first nominal linear shift factor (88) and at least a second linear shift factor (61) selected when the first threshold (86) is exceeded, each linear shift factor for adjusting the gain of the linear branch, and an integrator branch (56) connected to the output (52) of the difference means having a first nominal integrator shift factor (90), including a nominal update rate factor (100), and at least a second integrator shift factor (91), including at least a second update rate factor (101) selected when said first threshold is exceeded, each integrator shift factor for adjusting the value of the W-R output, wherein each update rate factor is for adjusting the integrator rate of the integrator and further wherein the integrator branch has an integrator register (57) selectably connected to the W-R output as passed through one of the integrator shift factors for repetitively integrating said W-R output, said leak filter further comprising an output summer module (270) for combining the outputs of the linear branch and integrator branch for providing a leak filter output (72), wherein the linear shift factor, integrator shift factor and update rate shift factors are changed as the W-R output exceeds at least one separate threshold value (86) so that the rate at which the rate of change of the read clock changes is increased as each higher threshold value is exceeded;
  D) a dither module (69) connected to the output summer module (270) of the leak filter, the dither module supplying a pseudo random value to the leak filter output value so as to effectively increase the resolution of the desynchronizer and thereby allow smooth phase transitions for small changes in the write data rate for the read clock as the W-R output value approaches a value representative of the elastic store center position; and
  E) means (28, 30, 34, 36, 32) for converting the output (72) of the leak filter into a variable frequency rate (46) as determined by the value of the leak filter output so as to read data from the elastic store;
whereby the read data rate approximates the average write data rate and the change in the read data rate is minimized for changes in the average write data rate and the rate of change in the read data rate is increased as the detected threshold is exceeded.

12. A desynchronizer as defined in claim 11, wherein at least a portion of the leak filter linear branch and integrator branch includes a calculation means (82', 82'') comprising an adder (80), temporary storage means (132) for the storage of partial arithmetic and logic results, and control means (118, 120, 122, 124) for selectively controlling the input of the shift factor values and partial results to the adder for iterative calculations for ultimate generation of the output value of the leak filter.

13. A desynchronizer as defined in claim 12, wherein the calculation means performs all of its iterative calculations for generation of a leak filter output value during the time period of one frame of the synchronous communication protocol.

14. A desynchronizer (20) for smoothing a read clock (46) associated with data from a digital signal transported within a payload envelope of a synchronous communication protocol comprising a plurality of incoming synchronous frames, each frame comprising a plurality of rows of information, in which the payload is stored within a portion of one or more frames and wherein the position of the payload may vary from frame to frame, comprising:
  A) an elastic store (22) having a write clock input (31), a read clock input (33), a data input (41), a data output (48), and an input (44) for receipt of information regarding the presence of data on said data input (41), said elastic store having a memory for storing said data as that data is received on the data input at a write data rate, said elastic store generating outputs (35, 37) representative of write and read address values;
  B) difference means (24) connected to the write address and read address outputs (35, 37) of the elastic store so as to determine an output (52) (W-R) proportional to the difference between the write and read addresses for a plurality of rows associated with the incoming synchronous frames, said difference means (24) comprising;
    1) a row averager (24', 25), responsive to the write address and read address outputs (35, 37) of the elastic store, for providing a row average signal;
    2) an elastic store center shift (ESS) module (85) for producing an ESS parameter signal for indicating the average offset; and
    3) a summer (85a), responsive to the row average signal and the ESS parameter signal, for providing said output (52);
  C) a leak filter (26) connected to the output (52) of said difference means (24), the leak filter for generating an output (72) so as to cause an adjustment in a read data rate associated with the elastic store, said leak filter comprising a linear branch (54) connected to the output (52) of the difference means, said linear branch having threshold detector means for comparing the output (52) of the difference means to at least a first threshold (86) so as to determine if said output exceeds said at least first threshold, the linear branch having a first nominal linear shift factor (88) and at least a second linear shift factor (61) selected when the first threshold (86) is exceeded, each linear shift factor for adjusting the gain of the linear branch, and an integrator branch (56) connected to the output (52) of the difference means having a first nominal integrator shift factor (90) and at least a second integrator shift factor (91) selected when said first threshold is exceeded, each integrator shift factor for adjusting the value of the W-R output, and further wherein the integrator branch has an integrator register (57) selectably connected to the W-R output as passed through one of the integrator shift factors for repetitively integrating said shifted W-R output, said leak filter further comprising an output summer module (270) for combining the outputs of the linear branch and integrator branch for providing a leak filter output (72); and D) means (28, 30, 34, 36, 32) for converting the output (72) of the leak filter into a variable frequency rate (46) as determined by the value of the leak filter output so as to read data from the elastic store;

whereby the read data rate approximates the average write data rate and the change in the read data rate is minimized for changes in the average write data rate and the rate of change in the read data rate is increased as the detected threshold is exceeded.

15. A desynchronizer as defined in claim 14, wherein said ESS module is programmable so as to provide a programmable ESS parameter signal.

16. A desynchronizer (20) for smoothing a read clock (46) associated with data from a digital signal transported within a payload envelope of a synchronous communication protocol comprising a plurality of incoming synchronous frames, each frame comprising a plurality of rows of information, in which the payload is stored within a portion of one or more frames and wherein the position of the payload may vary from frame to frame, comprising:

A) an elastic store (22) having a write clock input (31), a read clock input (33), a data input (41), a data output (48), and an input (44) for receipt of information regarding the presence of data on said data input (41), said elastic store having a memory for storing said data as that data is received on the data input at a write data rate, said elastic store generating outputs (35, 37) representative of write and read address values;

B) difference means (24) connected to the write address and read address outputs (35, 37) of the elastic store so as to determine an output (52) (W-R) proportional to the difference between the write and read addresses for a plurality of rows associated with the incoming synchronous frames;

C) a leak filter (26) connected to the output (52) of said difference means (24), the leak filter for generating an output (72) so as to cause an adjustment in a read data rate associated with the elastic store, said leak filter comprising a linear branch (54) connected to the output (52) of the difference means, the linear branch having threshold detector means for comparing the output (52) of the difference means to at least a first threshold (86) so as to determine if said output exceeds said at least first threshold, the linear branch having a first nominal linear shift factor (88) and at least a second linear shift factor (61) selected when the first threshold (86) is exceeded, each linear shift factor for adjusting the gain of the linear branch, and an integrator branch (56) connected to the output (52) of the difference means having a first nominal integrator shift factor (90), and at least a second integrator shift factor (91), selected when said first threshold is exceeded, each integrator shift factor for adjusting the value of the W-R output, and further wherein the integrator branch has an integrator register (57) selectably connected to the W-R output as passed through one of the integrator shift factors for repetitively integrating said shifted W-R output, said leak filter further comprising an output summer module (270) for combining the outputs of the linear branch and integrator branch for providing a leak filter output (72);

D) a dither module (69) connected to the output summer module (270) of the leak filter, the dither module supplying a pseudo random value to the leak filter output value so as to effectively increase the resolution of the desynchronizer and thereby allow smooth phase transitions for small changes in the write data rate for the read clock as the W-R output value approaches a value representative of the elastic store center position; and E) means (28, 30, 34, 36, 32) for converting the output (72) of the leak filter into a variable frequency rate (46) as determined by the value of the leak filter output so as to read data from the elastic store;

whereby the read data rate approximates the average write data rate and the change in the read data rate is minimized for changes in the average write data rate and the rate of change in the read data rate is increased as the detected threshold is exceeded.

* * * * *